(12) United States Patent  
Miyake

(10) Patent No.: US 10,340,495 B2  
(45) Date of Patent: Jul. 2, 2019

(54) POWER STORAGE UNIT AND ELECTRONIC DEVICE

(71) Applicant: Semiconductor Energy Laboratory Co., Ltd., Atsugi-shi, Kanagawa-ken (JP)

(72) Inventor: Hiroyuki Miyake, Kanagawa (JP)

(73) Assignee: Semiconductor Energy Laboratory Co., Ltd., Kanagawa-ken (JP)

(*) Notice: Subject to any disclaimer, the term of this patent is extended or adjusted under 35 U.S.C. 154(b) by 357 days.

(21) Appl. No.: 14/921,179

(22) Filed: Oct. 23, 2015

(65) Prior Publication Data

US 2016/0118640 A1 Apr. 28, 2016

(30) Foreign Application Priority Data

Oct. 24, 2014 (JP) .................. 2014-217576

(51) Int. Cl.
| | |
|---|---|
| H01M 2/00 | (2006.01) |
| H01M 2/26 | (2006.01) |
| G06F 1/16 | (2006.01) |
| H01M 2/02 | (2006.01) |
| H01M 2/10 | (2006.01) |

(52) U.S. Cl.
CPC ............ *H01M 2/26* (2013.01); *G06F 1/1613* (2013.01); *H01M 2/021* (2013.01); *H01M 2/1066* (2013.01); *H01M 2220/30* (2013.01)

(58) Field of Classification Search
CPC ...... H01M 2/26; H01M 2/021; H01M 2/1066; H01M 2220/30; G06F 1/1613
See application file for complete search history.

(56) References Cited

U.S. PATENT DOCUMENTS

| | | | |
|---|---|---|---|
| 5,339,091 A | 8/1994 | Yamazaki | |
| 5,475,398 A | 12/1995 | Yamazaki | |
| 8,884,845 B2 | 11/2014 | Yamazaki et al. | |
| 2009/0071952 A1 | 3/2009 | Kuwabara | |
| 2012/0237817 A1* | 9/2012 | Kim | H01M 2/26 429/158 |
| 2013/0029214 A1* | 1/2013 | Tamura | H01M 2/06 429/179 |
| 2013/0273405 A1 | 10/2013 | Takahashi et al. | |
| 2018/0013114 A1* | 1/2018 | Fuhr | H01M 2/1077 |

FOREIGN PATENT DOCUMENTS

| | | |
|---|---|---|
| JP | 2005-157317 A | 6/2005 |
| JP | 2011-249290 A | 12/2011 |

* cited by examiner

*Primary Examiner* — Raymond Alejandro  
(74) *Attorney, Agent, or Firm* — Nixon Peabody LLP; Jeffrey L. Costellia

(57) ABSTRACT

A power storage unit suitable for a wearable device is provided. A novel power storage unit or power storage device is provided. The power storage unit includes a positive electrode and a negative electrode inside an external body. The positive electrode includes a positive electrode tab portion protruding from the positive electrode in one direction. The negative electrode includes a negative electrode tab portion protruding from the negative electrode in one direction. The power storage unit includes a first lead electrode electrically connected to the positive electrode tab portion and a second lead electrode electrically connected to the negative electrode tab portion. The first lead electrode includes a first fold portion. The second lead electrode includes a second fold portion.

32 Claims, 24 Drawing Sheets

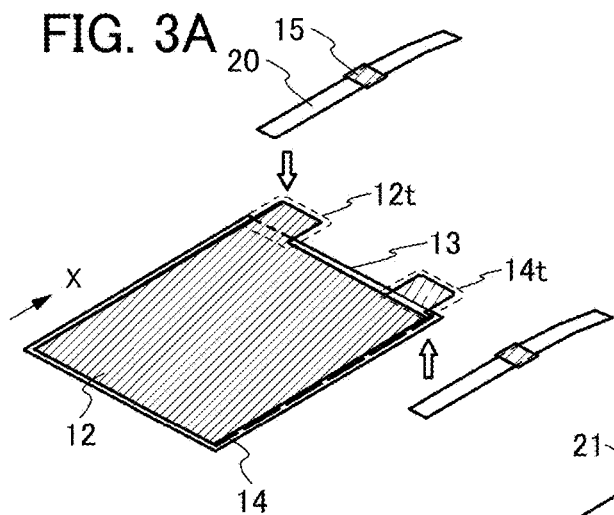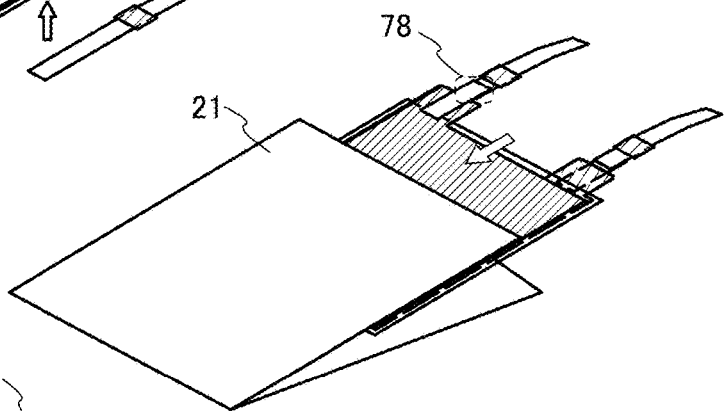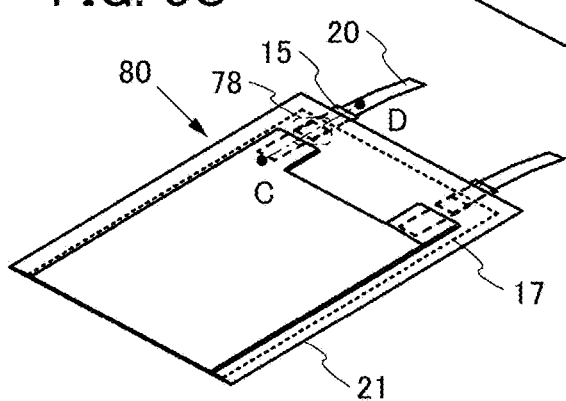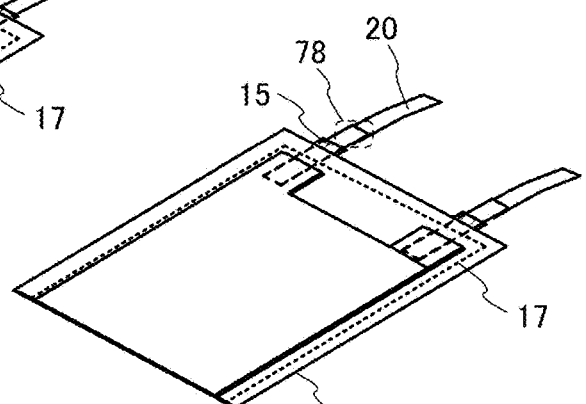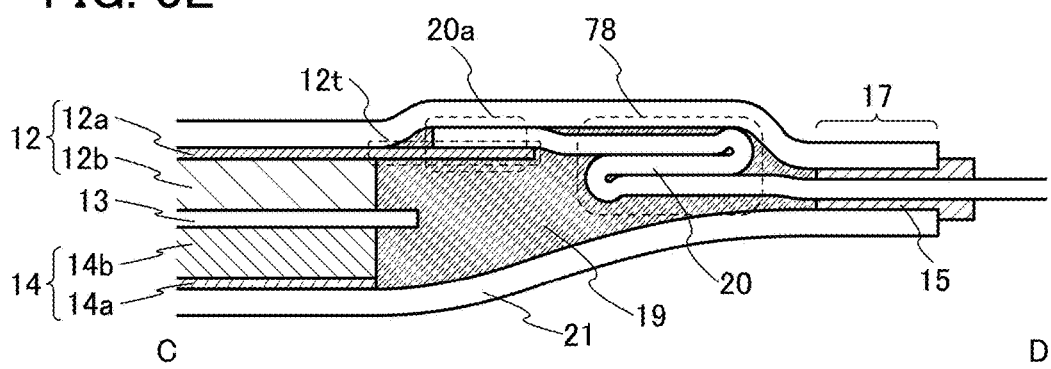

POWER STORAGE UNIT AND ELECTRONIC DEVICE

BACKGROUND OF THE INVENTION

1. Field of the Invention

Embodiments of the present invention relate to a power storage unit and an electronic device.

Note that one embodiment of the present invention is not limited to the above technical field. The technical field of one embodiment of the invention disclosed in this specification and the like relates to an object, a method, or a manufacturing method. One embodiment of the present invention relates to a process, a machine, manufacture, or a composition of matter. Specifically, examples of the technical field of one embodiment of the present invention disclosed in this specification include a semiconductor device, a display device, a power storage device, a method for driving any of them, and a method for manufacturing any of them.

Note that power storage units in this specification mean all elements and devices having a function of storing power.

In recent years, portable information terminals typified by smartphones have been actively developed. Portable information terminals, which are a kind of electronic devices, are desired to be lightweight and compact by users.

Patent Document 1 discloses an example of a hands-free wearable device with which information can be visually obtained anywhere, specifically, a goggle-type display device that includes a CPU and is capable of data communication. The device disclosed in Patent Document 1 is also a kind of electronic device.

Most wearable devices and portable information terminals include power storage units that can be repeatedly charged and discharged, and have problems in that there is a limitation on the time for operation of the wearable devices and the portable information terminals because their light weight and compactness limit the battery capacity. Power storage units used in wearable devices and portable information terminals should be lightweight and compact and should be able to be used for a long time.

Examples of power storage units include a nickel-metal hydride battery and a lithium-ion power storage unit. In particular, lithium-ion secondary batteries have been actively researched and developed because the capacity thereof can be increased and the size thereof can be reduced.

REFERENCE

[Patent Document 1] Japanese Published Patent Application No. 2005-157317

SUMMARY OF THE INVENTION

Another object is to provide a power storage unit suitable for a wearable device. Another object is to provide a novel power storage unit or power storage device.

Another object is to provide an electronic device having a novel structure, specifically, an electronic device having a novel structure that can be changed in appearance in various ways. Another object is to provide an electronic device having a novel structure that can have various forms and a power storage unit that fits the forms of the electronic device.

Note that the descriptions of these objects do not disturb the existence of other objects. In one embodiment of the present invention, there is no need to achieve all the objects. Other objects will be apparent from and can be derived from the descriptions of the specification, the drawings, the claims, and the like.

In the case where an electronic device is formed to have a complicated form, a housing is designed to have a complicated form and electronic components (e.g., a power source, a wiring, a transistor, a resistor, and a capacitor) are arranged in an internal space of the housing. When the electronic device is large, the volume of the internal space of the housing is relatively large; thus, the electronic components can be arranged relatively freely.

In contrast, in the case where an electronic device having a complicated form is compact, the volume of an internal space of a housing is small, and electronic components and the sizes thereof are selected according to the volume and the electronic components are arranged. In this case, the manufacturing cost is increased because smaller electronic components are more expensive.

Moreover, a power storage unit with higher capacity tends to have larger volume. Therefore, there are limitations on the size and arrangement of a power storage unit that is incorporated in a small electronic device.

An increase in the mileage per charge of a vehicle using a power storage unit such as an electric vehicle and a hybrid vehicle increases the volume of the power storage unit.

In view of the above, a power storage unit that can be changed in form is used for an electronic device and the power storage unit and other electronic components are arranged with efficiency in the internal space of a housing of the electronic device.

In the case where a power storage unit is changed in form by externally applying force, the force is externally applied to an object such as a positive electrode or a negative electrode included in the power storage unit and the object is stressed. This might partly deform or damage the object.

In view of the above, one embodiment of the present invention is a power storage unit having a structure that relaxes stress. Another embodiment of the present invention is a power storage unit that can relieve a strain caused by stress. Here, a "strain" is the scale of change in form indicating the displacement of a point of an object relative to the reference (initial) length of the object.

One embodiment of the present invention is a power storage unit including a positive electrode and a negative electrode inside an external body. The positive electrode includes a positive electrode tab portion protruding from the positive electrode in one direction. The negative electrode includes a negative electrode tab portion protruding from the negative electrode in one direction. The power storage unit includes a first lead electrode electrically connected to the positive electrode tab portion and a second lead electrode electrically connected to the negative electrode tab portion. The first lead electrode includes a first fold portion. The second lead electrode includes a second fold portion.

In the above power storage unit, it is preferred that an angle formed by a fold line of the first fold portion and a straight line parallel to the protruding direction of the positive electrode tab portion be greater than or equal to 45° and less than or equal to 90° and an angle formed by a fold line of the second fold portion and a straight line parallel to the protruding direction of the negative electrode tab portion be greater than or equal to 45° and less than or equal to 90°.

One embodiment of the present invention is a power storage unit including a positive electrode and a negative electrode inside an external body. The positive electrode includes a positive electrode tab portion protruding from the positive electrode in one direction. The negative electrode includes a negative electrode tab portion protruding from the negative electrode in one direction. The power storage unit includes a first lead electrode electrically connected to the positive electrode tab portion and a second lead electrode electrically connected to the negative electrode tab portion. The first lead electrode includes a first bent portion. The second lead electrode includes a second bent portion.

In the above power storage unit, the thickness of part of the external body is preferably greater than or equal to 20 μm and less than or equal to 150 μm.

Furthermore, in the above power storage unit, at least part of the external body may be provided with a plurality of projections or depressions.

Furthermore, the above power storage unit may include a plurality of positive electrodes and a plurality of negative electrodes.

An electronic device including the above power storage unit and at least one of a display portion, an operation button, a speaker, and a microphone is also one embodiment of the present invention.

The power storage unit of one embodiment of the present invention can change its form with a curvature radius of greater than or equal to 30 mm, preferably greater than or equal to 10 mm. One or two films are used as the exterior body of the power storage unit. In the case where the power storage unit has a layered structure, a cross section of the bent power storage unit has a structure where electrodes, an electrolytic solution, and the like are sandwiched between two curves of the film.

Here, description is given of the radius of curvature of a surface with reference to FIGS. 12A to 12C. In FIG. 12A, on a plane 1701 along which a curved surface 1700 is cut, part of a curve 1702 forming the curved surface 1700 is approximate to an arc of a circle, and the radius of the circle is referred to as a radius 1703 of curvature and the center of the circle is referred to as a center 1704 of curvature. FIG. 12B is a top view of the curved surface 1700. FIG. 12C is a cross-sectional view of the curved surface 1700 taken along the plane 1701. When a curved surface is cut along a plane, the radius of curvature of a curve in a cross section differs depending on the angle between the curved surface and the plane or on the cut position, and the smallest radius of curvature is defined as the radius of curvature of a surface in this specification and the like.

In the case of bending a power storage unit in which a battery component 1805 including electrodes and an electrolytic solution is sandwiched between two films as exterior bodies, a radius 1802 of curvature of a film 1801 close to a center 1800 of curvature of the power storage unit is smaller than a radius 1804 of curvature of a film 1803 far from the center 1800 of curvature (FIG. 13A). When the power storage unit is curved and has an arc-shaped cross section, compressive stress is applied to a surface of the film on the side closer to the center 1800 of curvature and tensile stress is applied to a surface of the film on the side farther from the center 1800 of curvature (FIG. 13B). However, by forming a pattern including projections or depressions on surfaces of the exterior bodies, the influence of a strain can be reduced to be acceptable even when compressive stress and tensile stress are applied. For this reason, the power storage unit can change its form such that the exterior body on the side closer to the center of curvature has a curvature radius greater than or equal to 30 mm, preferably greater than or equal to 10 mm.

Note that the cross-sectional shape of the power storage unit is not limited to a simple arc shape, and the cross section can be partly arc-shaped; for example, a shape illustrated in FIG. 13C, a wavy shape illustrated in FIG. 13D, or an S shape can be used. When the curved surface of the power storage unit has a shape with a plurality of centers of curvature, the power storage unit can change its form such that a curved surface with the smallest radius of curvature among radii of curvature with respect to the plurality of centers of curvature, which is a surface of the exterior body on the side closer to the center of curvature, has a curvature radius greater than or equal to 30 mm, preferably greater than or equal to 10 mm.

One embodiment of the present invention can be used for various power storage devices. Examples of such power storage devices include a battery, a primary battery, a secondary battery, a lithium-ion secondary battery, a lithium air battery, a lead storage battery, a lithium-ion polymer secondary battery, a nickel-hydrogen storage battery, a nickel-cadmium storage battery, a nickel-iron storage battery, a nickel-zinc storage battery, a silver oxide-zinc storage battery, and a solid-state battery. In addition, a capacitor is given as another example of the power storage devices. For example, with a combination of the negative electrode of one embodiment of the present invention and an electric double layer positive electrode, a capacitor such as a lithium-ion capacitor can be fabricated.

Examples of wearable devices include wearable input terminals such as a wearable camera, a wearable microphone, and a wearable sensor, wearable output terminals such as a wearable display and a wearable speaker, and wearable input/output terminals having the functions of any of the input terminals and any of the output terminals. Another example of a wearable device is a device that controls each device and calculates or processes data, typically, a wearable computer including a CPU. Other examples of wearable devices include devices that store data, send data, and receive data, typically, a portable information terminal and a memory.

A power storage unit suitable for portable information terminals can be provided. A power storage unit suitable for wearable devices can be provided. A novel power storage unit or power storage device can be provided.

The form of a power storage unit can be freely designed and when a power storage unit having a curved surface is used for example, the flexibility of a whole device is increased and devices having a variety of designs can be fabricated. Furthermore, a power storage unit is provided inside and along a curved surface of a device with the least wasted space in the device having the curved surface, whereby it is possible to make maximum use of a space in the device.

Thus, an electronic device having a novel structure can be provided.

Note that the description of these effects does not disturb the existence of other effects. One embodiment of the present invention does not have to have all the effects listed above. Other effects will be apparent from and can be derived from the description of the specification, the drawings, the claims, and the like.

BRIEF DESCRIPTION OF THE DRAWINGS

FIGS. 3A to 3E are perspective views and a cross-sectional view illustrating a power storage unit of one embodiment of the present invention.

DETAILED DESCRIPTION OF THE INVENTION

Embodiments and an example of the present invention will be described below in detail with reference to the drawings. However, the present invention is not limited to the description below, and it is easily understood by those skilled in the art that modes and details disclosed herein can be modified in various ways. Further, the present invention is not construed as being limited to the description of the embodiments and example.

Note that in each drawing referred to in this specification, the size or the layer thickness of each component is exaggerated or a region of each component is omitted for clarity of the invention in some cases. Therefore, embodiments of the present invention are not limited to such a scale.

Note that ordinal numbers such as "first" and "second" in this specification and the like are used in order to avoid confusion among components and do not denote the priority or the order such as the order of steps or the stacking order. A term without an ordinal number in this specification and the like is provided with an ordinal number in a claim in some cases in order to avoid confusion among components.

Embodiment 1

A fabricating method and a structural example of a power storage unit 40 of one embodiment of the present invention will be described with reference to drawings.

First, a fabricating method for a power storage unit 40 of one embodiment of the present invention will be described.

Figure 1A:
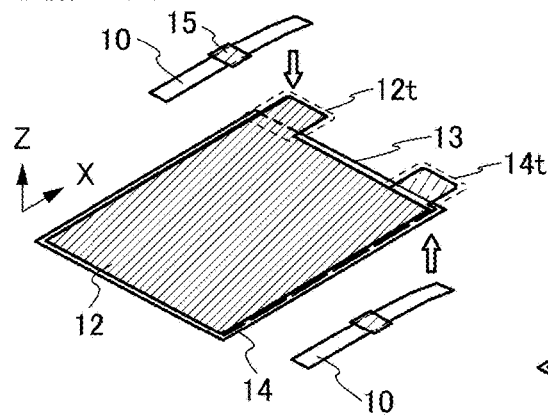
FIGS. 1A to 1E are perspective views and a cross-sectional view illustrating a power storage unit of one embodiment of the present invention.

First, a stack in which a negative electrode 14, a separator 13, and a positive electrode 12 as components of a storage battery are stacked in this order (hereinafter also simply referred to as a stack) and two lead electrodes 10 each with a sealing layer 15 are prepared (FIG. 1A). The positive electrode 12 includes a positive electrode current collector 12a and a positive electrode active material layer 12b formed in contact with the positive electrode current collector 12a. The negative electrode 14 includes a negative electrode current collector 14a and a negative electrode active material layer 14b formed in contact with the negative electrode current collector 14a. The lead electrode 10 is also referred to as a lead terminal and provided in order to lead the positive electrode or the negative electrode of the power storage unit to the outside of an exterior body.

Then, one of the lead electrodes 10 is electrically connected to a portion of the positive electrode 12 that protrudes in one direction (hereinafter also referred to as a positive electrode tab portion 12t) by ultrasonic welding or the like. As a material of the lead electrode 10 that is connected to the positive electrode tab portion 12t, aluminum is used, for example. The other lead electrode 10 is electrically connected to a portion of the negative electrode 14 that protrudes in one direction (hereinafter also referred to as a negative electrode tab portion 14t) by ultrasonic welding or the like. As a material of the lead electrode 10 that is connected to the negative electrode tab portion 14t, nickel-plated copper is used, for example. The lead electrode 10 electrically connected to the positive electrode tab portion 12t has the same potential as the positive electrode 12, and the same applies to the negative electrode 14. For this reason, materials that can be used for the positive electrode 12 or the negative electrode 14 can be used in the lead electrode 10.

In this example of the fabricating method, one lead electrode 10 is connected to the upper surface of the positive electrode tab portion 12t, and the other lead electrode 10 is connected to the lower surface of the negative electrode tab portion 14t. Here, the direction shown by an arrow Z in FIG. 1A is the upward direction. Such a structure can prevent a short circuit between the positive electrode 12 and the negative electrode 14 through the lead electrodes 10. Alternatively, the two respective lead electrodes 10 can be connected to either the upper surfaces or the lower surfaces of the positive electrode tab portion 12t and the negative electrode tab portion 14t. For example, the two respective lead electrodes 10 may be connected to the lower surfaces of the positive electrode tab portion 12t and the negative electrode tab portion 14t. In the case where such a structure is employed, as described later, the position of a fold portion 10b of the lead electrode 10 connected to the positive electrode tab portion 12t is shifted in the direction shown by the arrow X in FIG. 1A so that the lead electrode 10 can be prevented from being in contact with the negative electrode 14.

In forming a connection portion 10a between a positive electrode tab portion 12t and the lead electrode 10, connection is preferably performed such that the extending direction of the lead electrode 10 from the connection portion 10a is different from the protruding direction of the positive electrode tab portion 12t (i.e., the direction shown by the arrow X in FIG. 1A). Specifically, an angle between the extending direction and the protruding direction is preferably larger than or equal to 90° and smaller than or equal to 180°. When the extending direction and the protruding direction are different from each other, the lead electrode 10 can be provided with a fold portion, and the extending direction of the lead electrode 10 can be substantially in line with the protruding direction of the positive electrode tab portion 12t (or the negative electrode tab portion 14t) in the completed power storage unit 40. As the angle between the extending direction and the protruding direction becomes closer to 180°, the fold portion can relax stress more effectively as described later.

Figure 1B:
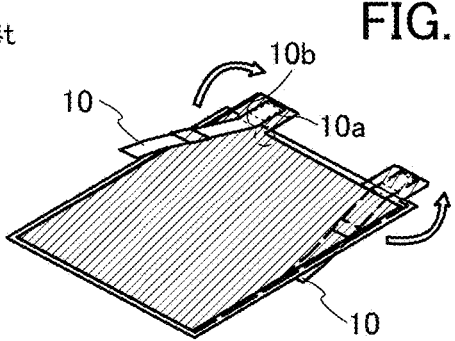
Figure 2A:
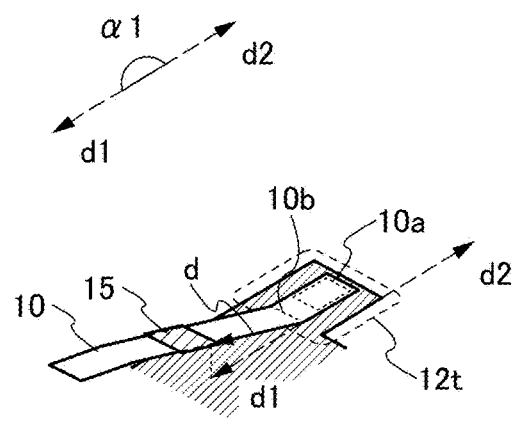
FIGS. 2A to 2D are perspective views each illustrating the extending direction of a lead electrode.

Here, the extending direction of the lead electrode 10 will be described with reference to FIG. 2A. FIG. 2A is an enlarged perspective view illustrating an area around the lead electrode 10, the sealing layer 15, and the positive electrode tab portion 12t of the positive electrode 12 in FIG. 1B. In this specification, "the extending direction of the lead electrode 10 from the connection portion 10a" means the direction indicated by a vector d1, which is the orthogonal projection of a vector d along a side of the lead electrode 10 to a surface including that of the positive electrode 12, when one end of the fold portion 10b is a starting point. The protruding direction of the positive electrode tab portion 12t, which is shown as the direction indicated by the arrow X in FIG. 1A corresponds to the direction indicated by a vector d2 in FIG. 2A. In this example of the fabricating method, the lead electrode 10 is connected to the positive electrode tab portion 12t such that an angle α1 between the vector d1 and the vector d2 is 180°. FIG. 2C is a perspective view illustrating an area around the positive electrode tab portion 12t when the connection portion 10a is formed such that the angle α1 between the vector d1 and the vector d2 is 135°.

Subsequently, the lead electrode 10 is folded in the direction shown by arrows in FIG. 1B to form the fold portion 10b. At this time, the fold portion 10b is formed such that the extending direction of the lead electrode 10 from the fold portion 10b is substantially in line with the protruding direction of the positive electrode tab portion 12t. An angle formed by a fold line of the fold portion 10b and a straight line parallel to the extending direction of the lead electrode 10 from the fold portion 10b is preferably larger than or equal to 45° and smaller than or equal to 90°. In other words, an angle formed by the fold line of the fold portion 10b of the lead electrode 10 and a straight line parallel to the protruding direction of the positive electrode tab portion 12t is preferably larger than or equal to 45° and smaller than or equal to 90°. As the angle is closer to 90°, the fold portion 10b can relax stress more effectively.

Figure 2B:
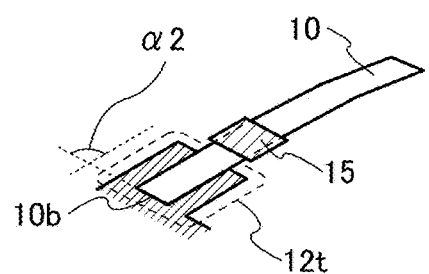
Figure 2C:
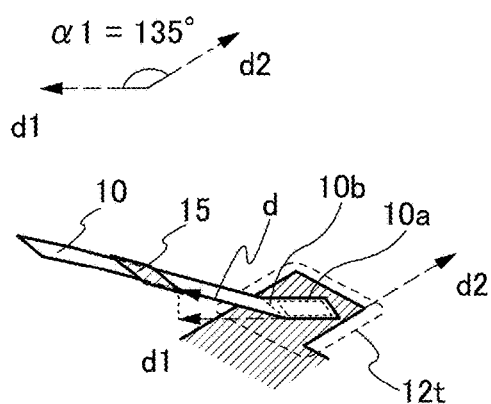
Figure 2D:
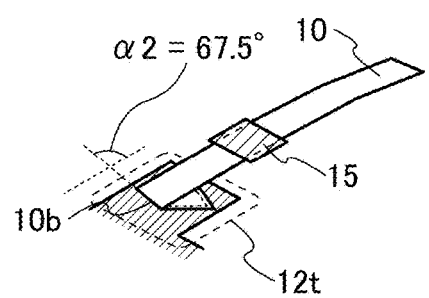

FIG. 2B is an enlarged perspective view illustrating an area around the lead electrode 10, the sealing layer 15, and the positive electrode tab portion 12t when the lead electrode 10 is provided with the fold portion 10b and the extending direction of the lead electrode 10 from the fold portion 10b is in line with the protruding direction of the positive electrode tab portion 12t. The angle formed by the fold line of the fold portion 10b of the lead electrode 10 and the straight line parallel to the protruding direction of the positive electrode tab portion 12t corresponds to an angle α2 shown in FIG. 2B. In this example of the fabricating method, the fold portion 10b is formed such that the angle α2 is 90°. When the connection portion 10a is formed as illustrated in FIG. 2C and the fold portion 10b is formed such that the extending direction of the lead electrode 10 from the fold portion 10b is substantially in line with the protruding direction of the positive electrode tab portion 12t, the angle α2 is 67.5° (see FIG. 2D). When the fold portion 10b is formed such that the extending direction of the lead electrode 10 from the fold portion 10b is substantially in line with the protruding direction of the positive electrode tab portion 12t, the angle α2 is approximately 0.5 times the angle α1.

In that case, the fold portion 10b is preferably formed with an interval provided between the fold portion 10b and the connection portion 10a. Providing the interval therebetween can reduce damage to a root portion of the connection portion 10a and the positive electrode tab portion 12t (a region surrounded by a circle in FIG. 1B) that is caused when the power storage unit 40 is curved and the lead electrode 10 is stretched in the extending direction. The interval is greater than or equal to 1 mm and less than or equal to 5 mm, for example.

As described above, in the case where the lead electrode 10 is connected to the lower surface of the positive electrode tab portion 12t, the position of the fold portion 10b of the lead electrode 10 is preferably shifted such that the interval between the fold portion 10b and the connection portion 10a is small. For example, the fold portion 10b is provided such that the lead electrode 10 is not in contact with the separator 13.

In a similar manner, the lead electrode 10 to be connected to the negative electrode 14 is connected to the negative electrode 14 and folded. Note that only one of the lead electrode 10 to be connected to the positive electrode 12 and the lead electrode 10 to be connected to the negative electrode 14 may be provided with the fold portion 10b. Furthermore, depending on where the power storage unit 40 is connected in an electronic device or the like, the fold portion 10b may be provided such that the extending direction of the lead electrode 10 from the fold portion 10b is different from the protruding direction of the positive electrode tab portion 12t (or the negative electrode tab portion 14t).

Figure 1C:
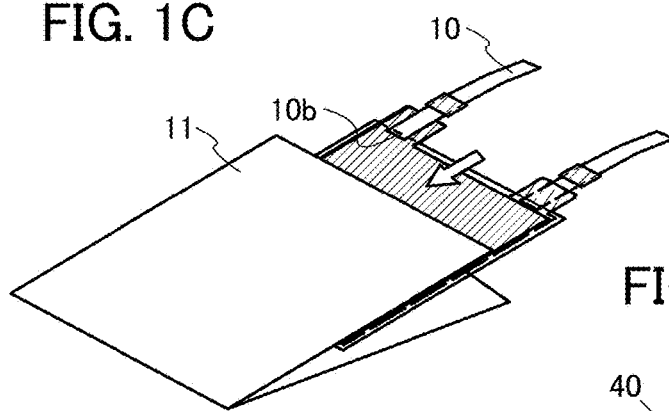

Next, a sheet made of a flexible material is prepared. The sheet preferably includes a plurality of layers. For example, a metal film provided with an adhesive layer (also referred to as a heat-seal layer) or sandwiched between adhesive layers is used. As the adhesive layer, a heat-seal resin film containing, e.g., polypropylene or polyethylene is used. In this embodiment, a metal sheet, specifically, aluminum foil whose top surface is provided with a nylon resin and whose bottom surface is provided with a stack including an acid-proof polypropylene film and a polypropylene film is used as the sheet. The aforementioned stack is provided so as to be sandwiched between facing surfaces of an exterior body 11 obtained by cutting this sheet and folding it (see FIG. 1C).

Then, two sides of the exterior body 11 are sealed by thermocompression bonding, and one side is left open for introduction of an electrolytic solution. Parts of two facing surfaces of the adhesive layer included in the folded exterior body 11 are melted, thereby being bonded to each other by thermocompression bonding. Furthermore, in thermocompression bonding, the sealing layer 15 is also melted in a region where the lead electrode 10 and the sealing layer 15 are sandwiched between the facing surfaces of the exterior body 11, thereby fixing the lead electrode 10 and the exterior body 11 to each other. After that, in a reduced-pressure atmosphere or an inert atmosphere, a desired amount of electrolytic solution is introduced to the inside of the exterior body 11 in the form of a bag. Lastly, the outer edge of the exterior body 11 that has not been subjected to thermocompression bonding and is left open is sealed by thermocompression bonding. A region between the dashed line in FIG. 1D and the edge is a thermocompression-bonded region 17.

Figure 1D:
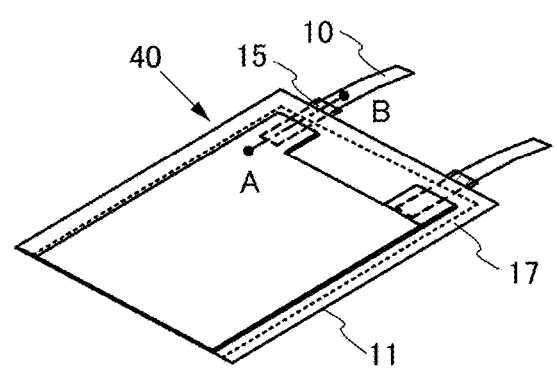

Through the above steps, the power storage unit 40 illustrated in FIG. 1D can be fabricated.

The obtained power storage unit 40 including the lead electrode 10 provided with the fold portion 10b can relax bending stress on a portion physically connected to the fold portion 10b. Specifically, bending stress on the positive electrode tab portion 12t and the negative electrode tab portion 14t can be relaxed. In particular, the roots of the positive electrode tab portion 12t and the negative electrode tab portion 14t may trigger damage when the whole power storage unit 40 is curved; since the power storage unit 40 of one embodiment of the present invention includes the lead electrode 10 provided with the fold portion 10b, the current collectors can be highly resistant to repeated bendings.

Moreover, when the power storage unit 40 includes the lead electrode 10 provided with the fold portion 10b, the conduction path of the lead electrode 10 is short; thus, the electric resistance of the lead electrode 10 may be reduced.

Figure 1E:
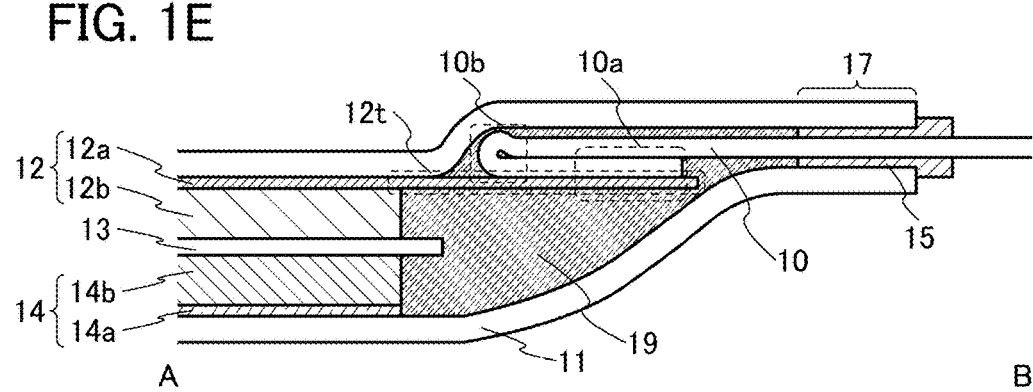

Here, FIG. 1E illustrates an example of a cross section along the dashed-dotted line A-B in FIG. 1D.

As illustrated in FIG. 1E, the structure of the power storage unit 40 is obtained in such a manner that a stack in which the negative electrode current collector 14a, the negative electrode active material layer 14b, the separator 13, the positive electrode active material layer 12b, and the positive electrode current collector 12a are stacked in this order is sandwiched between the facing surfaces of the folded exterior body 11 and sealed in the end portion by the adhesive layer and the sealing layer 15, and the rest of space surrounded by the exterior body 11 is filled with an electrolytic solution 19.

FIG. 1E illustrates an example of a schematic cross-sectional view of the connection portion 10a between the positive electrode 12 (the positive electrode current collector 12a) and the lead electrode 10 provided with the fold portion 10b. When a portion of the power storage unit 40 that is around the connection portion 10a is curved, the curvature of a portion of the lead electrode 10 that is around the fold portion 10b relatively increases, so that the curvature of the positive electrode tab portion 12t can relatively decreases. That is, the lead electrode 10 connected to the positive electrode 12 is provided with the fold portion 10b in the vicinity of the connection portion 10a, whereby stress on the positive electrode tab portion 12t can be relaxed. Similarly, the lead electrode 10 connected to the negative electrode 14 is provided with the fold portion 10b in the vicinity of the connection portion 10a, whereby stress on the negative electrode tab portion 14t can be relaxed.

Note that FIG. 1E illustrates the structure where the positive electrode current collector 12a is not curved in the vicinity of the connection portion 10a and the exterior body 11 having facing surfaces between which the stack and the lead electrode 10 are sandwiched is curved along the stack and the lead electrode 10; however, one embodiment of the present invention is not limited to this structure. For example, the positive electrode current collector 12a may be curved such that the curvature of a portion of the exterior body 11 having facing surfaces between which the stack and the lead electrode 10 are sandwiched that is around the connection portion 10a is small.

The structure of the power storage unit 40 is as follows, for example. The thickness of the positive electrode current collector 12a is approximately 10 μm to 30 μm. The thickness of the positive electrode active material layer 12b is approximately 100 μm. The thickness of the separator 13 is approximately 25 μm. The thickness of the negative electrode active material layer 14b is approximately 100 μm. The thickness of the negative electrode current collector 14a is approximately 10 μm to 30 μm. The thickness of the exterior body 11 is approximately 110 μm. In addition, the thickness of the metal film included in the exterior body 11 is, for example, approximately 40 μm. The power storage unit 40 is preferably flexible.

When the flexibility of the exterior body 11 is increased, the fold portion 10b can relax bending stress on the positive electrode tab portion 12t (or the negative electrode tab portion 14t) more effectively.

The thickness of the exterior body 11 is preferably small as long as the sealing property of the power storage unit 40 is ensured; for example, it is preferably greater than or equal to 20 μm and less than or equal to 150 μm. Furthermore, the thickness of the metal film included in the exterior body 11 is preferably greater than or equal to 5 μm and less than or equal to 20 μm. Furthermore, the thickness of part of the exterior body 11, for example, a portion of the exterior body 11 that overlaps with the fold portion 10b may be small.

Note that to increase the flexibility of the exterior body 11, an embossed sheet made of a flexible material may be used as the exterior body 11. An example of a power storage unit using an embossed exterior body will be described later in Embodiment 3.

The components of the power storage unit 40 will be described in detail below.

[1. Positive Electrode]

The positive electrode 12 includes, for example, a positive electrode current collector 12a and a positive electrode active material layer 12b formed over the positive electrode current collector 12a. Although the example of providing the positive electrode active material layer 12b over one surface of the positive electrode current collector 12a with a sheet form (or a strip-like form) is described, one embodiment of the present invention is not limited to this example. The positive electrode active material layers 12b may be provided so that the positive electrode current collector 12a is sandwiched therebetween, in which case the capacity of the power storage unit 40 can be increased. Furthermore, the positive electrode active material layer 12b may be provided either over the entire region of the positive electrode current collector 12a or over part of the positive electrode current collector 12a. In this embodiment, the positive electrode tab portion 12t of the positive electrode current collector 12a is not provided with the positive electrode active material layer 12b.

The positive electrode current collector 12a can be formed using a material which has high conductivity and is not alloyed with a carrier ion of lithium or the like, such as stainless steel, gold, platinum, zinc, iron, copper, aluminum, and titanium, an alloy thereof, and the like. Alternatively, an aluminum alloy to which an element that improves heat resistance, such as silicon, titanium, neodymium, scandium, and molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The positive electrode current collector 12a can have a foil-like shape, a plate-like shape (sheet-like shape), a net-like shape, a punching-metal shape, an expanded-metal shape, or the like as appropriate. The positive electrode current collector 12a preferably has a thickness greater than or equal to 5 μm and less than or equal to 30 μm. The surface of the positive electrode current collector 12a may be provided with an undercoat using graphite or the like.

The positive electrode active material layer 12b may further include a binder for increasing adhesion of positive electrode active materials, a conductive additive for increasing the conductivity of the positive electrode active material layer 12b, and the like in addition to the positive electrode active materials.

Examples of a positive electrode active material used for the positive electrode active material layer 12b include a composite oxide with an olivine crystal structure, a composite oxide with a layered rock-salt crystal structure, and a composite oxide with a spinel crystal structure. As the positive electrode active material, a compound such as $LiFeO_2$, $LiCoO_2$, $LiNiO_2$, $LiMn_2O_4$, $V_2O_5$, $Cr_2O_5$, and $MnO_2$ can be used.

$LiCoO_2$ is particularly preferable because it has high capacity, stability in the air higher than that of $LiNiO_2$, and thermal stability higher than that of $LiNiO_2$, for example.

A small amount of lithium nickel oxide ($LiNiO_2$ or $LiNi_{1-x}M_xO_2$ (M=Co, Al, or the like, $0<x<1$)) is preferably added to a lithium-containing material with a spinel crystal structure which contains manganese, such as $LiMn_2O_4$, because advantages such as inhibition of the dissolution of manganese and the decomposition of an electrolytic solution can be obtained.

Alternatively, a complex material ($LiMPO_4$ (general formula) (M is one or more of Fe(II), Mn(II), Co(II), and Ni(II))) can be used. Typical examples of the general formula $LiMPO_4$ which can be used as a material are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ ($a+b \leq 1$, $0<a<1$, and $0<b<1$), $LiFe_cNi_dCo_ePO_4$, $LiFe_cNi_dMn_ePO_4$, $LiNi_cCo_dMn_ePO_4$ ($c+d+e \leq 1$, $0<c<1$, $0<d<1$, and $0<e<1$), and $LiFe_fNi_gCo_hMn_iPO_4$ ($f+g+h+i \leq 1$, $0<f<1$, $0<g<1$, $0<h<1$, and $0<i<1$).

$LiFePO_4$ is particularly preferable because it properly has properties necessary for the positive electrode active material, such as safety, stability, high capacity density, high potential, and the existence of lithium ions which can be extracted in initial oxidation (charge).

Alternatively, a complex material such as $Li_{(2-j)}MSiO_4$ (general formula) (M is one or more of Fe(II), Mn(II), Co(II), and Ni(II); $0 \leq j \leq 2$) may be used. Typical examples of the general formula $Li_{(2-j)}MSiO_4$ which can be used as a material are lithium compounds such as $Li_{(2-j)}FeSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ ($k+l \leq 1$, $0<k<1$, and $0<l<1$), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ ($m+n+q \leq 1$, $0<m<1$, $0<n<1$, and $0<q<1$), and $Li_{(2-j)}Fe_rNi_sCo_tMn_uSiO_4$ ($r+s+t+u \leq 1$, $0<r<1$, $0<s<1$, $0<t<1$, and $0<u<1$).

Still alternatively, a nasicon compound expressed by $A_xM_2(XO_4)_3$ (general formula) (A=Li, Na, or Mg, M=Fe, Mn, Ti, V, Nb, or Al, X=S, P, Mo, W, As, or Si) can be used for the positive electrode active material. Examples of the nasicon compound are $Fe_2(MnO_4)_3$, $Fe_2(SO_4)_3$, and $Li_3Fe_2(PO_4)_3$. Further alternatively, a compound expressed by $Li_2MPO_4F$, $Li_2MP_2O_7$, or $Li_5MO_4$ (general formula) (M=Fe or Mn), a perovskite fluoride such as $NaF_3$ and $FeF_3$, a metal chalcogenide (a sulfide, a selenide, or a telluride) such as $TiS_2$ and $MoS_2$, an oxide with an inverse spinel structure such as $LiMVO_4$, a vanadium oxide ($V_2O_5$, $V_6O_{13}$, $LiV_3O_8$, or the like), a manganese oxide, an organic sulfur compound, or the like can be used as the positive electrode active material.

In the case where carrier ions are alkali metal ions other than lithium ions, or alkaline-earth metal ions, a material containing an alkali metal (e.g., sodium and potassium) or an alkaline-earth metal (e.g., calcium, strontium, barium, beryllium, and magnesium) instead of lithium may be used as the positive electrode active material. For example, the positive electrode active material may be a layered oxide containing sodium, such as $NaFeO_2$ and $Na_{2/3}[Fe_{1/2}Mn_{1/2}]O_2$.

Further alternatively, any of the aforementioned materials may be combined to be used as the positive electrode active material. For example, a solid solution obtained by combining two or more of the above materials can be used as the positive electrode active material. For example, a solid solution of $LiCo_{1/3}Mn_{1/3}Ni_{1/3}O_2$ and $Li_2MnO_3$ can be used as the positive electrode active material.

Note that although not illustrated, a conductive material such as a carbon layer may be provided on the surface of the positive electrode active material layer 12b. Providing a conductive material such as a carbon layer lead to increase in the conductivity of an electrode. For example, the positive electrode active material layer 12b can be coated with a carbon layer by mixing a carbohydrate such as glucose at the time of baking the positive electrode active material.

The average diameter of primary particles of the positive electrode active material layer 12b is preferably greater than or equal to 50 nm and less than or equal to 100 μm.

Examples of the conductive additive include acetylene black (AB), graphite (black lead) particles, carbon nanotubes, graphene, and fullerene.

A network for electrical conduction can be formed in the positive electrode 12 by the conductive additive. The conductive additive also allows maintaining of a path for electrical conduction between the positive electrode active materials in the positive electrode active material layer 12b. The addition of the conductive additive to the positive electrode active material layer 12b increases the electrical conductivity of the positive electrode active material layer 12b.

As the binder, polyvinylidene fluoride (PVDF) as a typical example, polyimide, polytetrafluoroethylene, polyvinyl chloride, ethylene-propylene-diene polymer, styrene-butadiene rubber, acrylonitrile-butadiene rubber, fluorine rubber, polyvinyl acetate, polymethyl methacrylate, polyethylene, nitrocellulose, or the like can be used.

The binder content in the positive electrode active material layer 12b is preferably greater than or equal to 1 wt % and less than or equal to 10 wt %, more preferably greater than or equal to 2 wt % and less than or equal to 8 wt %, still more preferably greater than or equal to 3 wt % and less than or equal to 5 wt %. The conductive additive content in the positive electrode active material layer 12b is preferably greater than or equal to 1 wt % and less than or equal to 10 wt %, more preferably greater than or equal to 1 wt % and less than or equal to 5 wt %.

In the case where the positive electrode active material layer 12b is formed by a coating method, the positive electrode active material, the binder, and the conductive additive are mixed to form a positive electrode paste (slurry), and the positive electrode paste is applied to the positive electrode current collector 12a and dried.

[2. Negative Electrode]

The negative electrode 14 includes, for example, a negative electrode current collector 14a and a negative electrode active material layer 14b formed in contact with the negative electrode current collector 14a. Although the example of providing the negative electrode active material layer 14b over one surface of the negative electrode current collector 14a with a sheet form (or a strip-like form) is described, one embodiment of the present invention is not limited to this example. The negative electrode active material layers 14b may be provided so that the negative electrode current collector 14a is sandwiched therebetween, in which case the capacity of the power storage unit 40 can be increased. Furthermore, the negative electrode active material layer 14b may be provided either over the entire region of the negative electrode current collector 14a or over part of the negative electrode current collector 14a. In this embodiment, the negative electrode tab portion 14t of the negative electrode current collector 14a is not provided with the negative electrode active material layer 14b.

The negative electrode current collector 14a can be formed using a material which has high conductivity and is not alloyed with a carrier ion of lithium or the like, such as stainless steel, gold, platinum, zinc, iron, copper, and titanium, an alloy thereof, and the like. Alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The negative electrode current collector 14a can have a foil-like shape, a plate-like shape (sheet-like shape), a net-like shape, a punching-metal shape, an expanded-metal shape, or the like as appropriate. The negative electrode current collector 14a preferably has a thickness greater than or equal to 5 µm and less than or equal to 30 µm. The surface of the negative electrode current collector 14a may be provided with an undercoat using graphite or the like.

The negative electrode active material layer 14b may further include a binder for increasing adhesion of negative electrode active materials, a conductive additive for increasing the conductivity of the negative electrode active material layer 14b, and the like in addition to the negative electrode active materials.

There is no particular limitation on the material of the negative electrode active material layer 14b as long as it is a material with which lithium can be dissolved and precipitated or a material into/from which lithium ions can be intercalated and deintercalated. Other than a lithium metal or lithium titanate, a carbon-based material generally used in the field of power storage can be used as the negative electrode active material layer 14b.

The lithium metal is preferable because of its low redox potential (3.045 V lower than that of a standard hydrogen electrode) and high specific capacity per unit weight and per unit volume (3860 mAh/g and 2062 mAh/cm$^3$).

Examples of the carbon-based material include graphite, graphitizing carbon (soft carbon), non-graphitizing carbon (hard carbon), a carbon nanotube, graphene, carbon black, and the like.

Examples of the graphite include artificial graphite such as meso-carbon microbeads (MCMB), coke-based artificial graphite, or pitch-based artificial graphite and natural graphite such as spherical natural graphite.

Graphite has a low potential substantially equal to that of a lithium metal (0.1 V to 0.3 V vs. Li/Li$^+$) when lithium ions are intercalated into a gap between layers of the graphite (while a lithium-graphite intercalation compound is formed). For this reason, a lithium-ion battery can have a high operating voltage. In addition, graphite is preferable because of its advantages such as relatively high capacity per unit volume, small volume expansion, low cost, and safety greater than that of a lithium metal.

For the negative electrode active material, a material or an oxide which enables charge-discharge reactions by an alloying reaction and a dealloying reaction with lithium can be used. In the case where carrier ions are lithium ions, a material containing at least one of Al, Si, Ge, Sn, Pb, Sb, Bi, Ag, Zn, Cd, In, Ga, and the like can be used as such a material which enables charge-discharge reactions, for example. Such elements have higher capacity than carbon. In particular, silicon has a significantly high theoretical capacity of 4200 mAh/g. For this reason, silicon is preferably used as the negative electrode active material. Examples of the material using such elements include $Mg_2Si$, $Mg_2Ge$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, $InSb$, $SbSn$, and the like.

Alternatively, as the negative electrode active material, an oxide such as SiO, SnO, $SnO_2$, titanium oxide ($TiO_2$), lithium titanium oxide ($Li_4Ti_5O_{12}$), lithium-graphite intercalation compound ($Li_xC_6$), niobium oxide ($Nb_2O_5$), tungsten oxide ($WO_2$), or molybdenum oxide ($MoO_2$) can be used.

Still alternatively, for the negative electrode active material layer 14b, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active materials and thus the negative electrode active materials can be used in combination with a material for a positive electrode active material which does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used for the negative electrode active material layer 14b; for example, a transition metal oxide which does not cause an alloy reaction with lithium, such as cobalt oxide (CoO), nickel oxide (NiO), and iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$.

In the case where the negative electrode active material layer 14b is formed by a coating method, the negative electrode active material and the binder are mixed to form a negative electrode paste (slurry), and the negative electrode paste is applied to the negative electrode current collector 14a and dried. Note that a conductive additive may be added to the negative electrode paste.

Graphene may be formed on a surface of the negative electrode active material layer 14b. For example, in the case of using silicon for the negative electrode active material layer 14b, the volume of silicon is greatly changed by reception and release of carrier ions in charge and discharge cycles. Thus, adhesion between the negative electrode current collector 14a and the negative electrode active material layer 14b is decreased, resulting in degradation of battery characteristics caused by charge and discharge. In view of this, graphene is preferably formed on the surface of the negative electrode active material layer 14b containing silicon, in which case even when the volume of silicon is changed in charge and discharge cycles, decrease in adhesion between the negative electrode current collector 14a and the negative electrode active material layer 14b can be inhibited, which makes it possible to reduce degradation of battery characteristics.

Alternatively, a coating film of an oxide or the like may be formed on the surface of the negative electrode active material layer 14b. A coating film formed by decomposition or the like of an electrolytic solution in charging cannot release electric charge used at the formation, and therefore forms irreversible capacity. In contrast, the film of an oxide or the like provided on the surface of the negative electrode active material layer 14b in advance can reduce or prevent generation of irreversible capacity.

As the coating film coating the negative electrode active material layer 14b, an oxide film of any one of niobium, titanium, vanadium, tantalum, tungsten, zirconium, molybdenum, hafnium, chromium, aluminum, and silicon or an oxide film containing any one of these elements and lithium can be used. Such a film is denser than a conventional film formed on a surface of a negative electrode because of a decomposition product of an electrolyte solution.

For example, niobium oxide ($Nb_2O_5$) has a low electric conductivity of $10^{-9}$ S/cm and an excellent insulating property. For this reason, a niobium oxide film hinders an electrochemical decomposition reaction between the negative electrode active material and the electrolytic solution. On the other hand, niobium oxide has a lithium diffusion coefficient of $10^{-9}$ cm$^2$/sec and high lithium ion conductivity. Therefore, niobium oxide can transmit lithium ions.

A sol-gel method can be used to coat the negative electrode active material layer 14b with the coating film, for example. The sol-gel method is a method for forming a thin film in such a manner that a solution of metal alkoxide, a metal salt, or the like is changed into a gel, which has lost its fluidity, by a hydrolysis reaction and a polycondensation reaction and the gel is baked. Since a thin film is formed from a liquid phase in the sol-gel method, raw materials can be mixed uniformly on the molecular scale. For this reason, by adding a negative electrode active material such as graphite to a raw material of the metal oxide film which is a solvent, the active material can be easily dispersed into the gel. In such a manner, the coating film can be formed on the surface of the negative electrode active material layer 14b. Decrease in the capacity of the power storage unit can be prevented by using the coating film.

[3. Separator]

Examples of materials for forming the separator 13 include porous insulators such as cellulose, polypropylene (PP), polyethylene (PE), polybutene, nylon, polyester, polysulfone, polyacrylonitrile, polyvinylidene fluoride, and tetrafluoroethylene. Alternatively, nonwoven fabric of a glass fiber or the like, or a diaphragm in which a glass fiber and a polymer fiber are mixed can be used.

[4. Electrolytic Solution]

As a solvent of the electrolytic solution 19 used for the power storage unit 40, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

When a gelled high-molecular material is used as a solvent of the electrolytic solution 19, safety against liquid leakage and the like is improved. Furthermore, a power storage unit can be thinner and more lightweight. Typical examples of the gelled high-molecular material include a silicone gel, an acrylic gel, an acrylonitrile gel, a polyethylene oxide-based gel, a polypropylene oxide-based gel, a fluorine-based polymer gel, and the like.

Alternatively, the use of one or more kinds of ionic liquids (room temperature molten salts) which have features of non-flammability and non-volatility as a solvent of the electrolytic solution 19 can prevent the power storage unit from exploding or catching fire even when the power storage unit internally shorts out or the internal temperature increases owing to overcharging or the like.

In the case of using lithium ions as carriers, as an electrolyte dissolved in the above-described solvent, one of lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}O_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used, or two or more of these lithium salts can be used in an appropriate combination in an appropriate ratio.

The electrolytic solution 19 used for the power storage unit 40 is preferably highly purified and contains a small amount of dust particles and elements other than the constituent elements of the electrolytic solution (hereinafter, also simply referred to as impurities). Specifically, the weight ratio of impurities to the electrolyte solution 19 is less than or equal to 1%, preferably less than or equal to 0.1%, and more preferably less than or equal to 0.01%. An additive agent such as vinylene carbonate may be added to the electrolyte solution 19.

[5. Exterior Body]

There are a variety of structures of a power storage unit, and a film is used for formation of the exterior body 11 in this embodiment. Note that the film used as the exterior body 11 is a single-layer film selected from metal films (e.g., an aluminum film, a stainless steel film, and a nickel steel film), a plastic film made of an organic material, a hybrid material film containing an organic material (e.g., an organic resin or fiber) and an inorganic material (e.g., ceramic), and carbon-containing inorganic films (e.g., a carbon film and a graphite film), or a layered film including two or more of the above films. The exterior body 11 is preferably formed using a metal film having high thermal conductivity so that the heat dissipation effect of the power storage unit 40 increases.

This embodiment can be implemented in combination with any of the other embodiments as appropriate.

Embodiment 2

In this embodiment, an example of a fabricating method and a structural example of a power storage unit 80 of one embodiment of the present invention will be described with reference to drawings. The power storage unit 80 is different from the power storage unit 40 described in Embodiment 1 mainly in the structure of a lead electrode. Differences of the power storage unit 80 from the power storage unit 40 will be mainly described below. That is to say, description in Embodiment 1 can be referred to for components of the power storage unit 80 that are similar to those of the power storage unit 40.

First, a fabricating method for the power storage unit 80 of one embodiment of the present invention will be described.

First, a stack including the positive electrode 12, the separator 13, and the negative electrode 14 as components of a storage battery (hereinafter simply referred to as a stack) and two lead electrodes 20 each with the sealing layer 15 are prepared (see FIG. 3A). A longer side of the lead electrode 20 is longer than that of the lead electrode 10.

Then, one of the lead electrodes 20 is electrically connected to the positive electrode tab portion 12t by ultrasonic welding or the like. After that, the other lead electrode 20 is electrically connected to the negative electrode tab portion 14t by ultrasonic welding or the like.

In forming a connection portion 20a between the positive electrode tab portion 12t and the lead electrode 20, connection is preferably performed such that the extending direction of the lead electrode 20 from the connection portion 20a is substantially in line with the protruding direction of the positive electrode tab portion 12t (the direction shown by the arrow X in FIG. 3A). In a similar manner, the negative electrode tab portion 14t and the lead electrode 20 are connected (in the direction indicated by the white arrow shown in FIG. 3A).

Then, a region between the connection portion 20a of the lead electrode 20 and the sealing layer 15 is processed to be changed in its form. The processing mainly includes bending. For the processing in this example of the fabricating method, 180° bending (hemming) is performed twice by hand or with an apparatus such as a bender or a presser so that a bend portion has a radius of curvature large enough to prevent damage to the lead electrode 20.

Note that a term "180° bending" in this specification is not limited to bending an object 180°. The term "180° bending" in this specification includes, for example, the case where a flat-plate object to be subjected to 180° bending is bent less than 180° and sides of the object that extend from the bent portion in two directions are not parallel to each other in a cross section of the object taken along a plane including a trace of the bending direction of the object. For example, an angle formed by the two sides can be larger than or equal to 150° and smaller than or equal to 180°.

In this example of the fabricating method, an example of an altered-shape region 78, which is a region of the lead electrode 20 that is subjected to the processing, will be described, and modification examples of the shape and a processing method of the altered-shape region 78 will be described later. The lead electrode 20 to be connected to the negative electrode 14 is connected to the negative electrode tab portion 14t and changed in its form, in a similar manner.

Next, an exterior body 21 is prepared, and the stack is inserted between facing surfaces of the exterior body 21 (see FIG. 3B). The power storage unit 80 includes the altered-shape region 78 in the sealed exterior body 21; thus, an exterior body that is larger than the exterior body 11 described in Embodiment 1 is used as the exterior body 21.

Then, two sides of the exterior body 21 are sealed by thermocompression bonding, and the electrolytic solution 19 is introduced to the inside of the exterior body 21 in the form of a bag. Lastly, the end portion of the exterior body 21 that has not been subjected to thermocompression bonding and is left open is sealed by thermocompression bonding.

Through the above steps, the power storage unit 80 illustrated in FIG. 3C can be fabricated.

Note that the altered-shape region 78 may be provided outside the sealed exterior body as illustrated in FIG. 3D. In that case, the exterior body 11 can be used as an exterior body. Such a structure can reduce the amount of the exterior body that is required to fabricate one power storage unit 80, reducing manufacturing costs.

The obtained power storage unit 80 includes the lead electrode 20 provided with the altered-shape region 78 can relax bending stress on a portion physically connected to the altered-shape region 78. Specifically, bending stress on the positive electrode tab portion 12t and the negative electrode tab portion 14t can be relaxed. In particular, the roots of the positive electrode tab portion 12t and the negative electrode tab portion 14t may trigger damage when the whole power storage unit 80 is curved; thus, when the power storage unit 80 of one embodiment of the present invention includes the lead electrode 20 provided with the altered-shape region 78, the current collectors can be highly resistant to repeated bendings.

Moreover, when the power storage unit 80 includes the lead electrode 20 provided with the altered-shape region 78, the conduction path of the lead electrode 20 is short; thus, the electric resistance of the lead electrode 20 may be reduced.

Here, FIG. 3E illustrates an example of a cross section along the dashed-dotted line C-D in FIG. 3C.

As illustrated in FIG. 3E, the structure of the power storage unit 80 is obtained in such a manner that a stack in which the negative electrode current collector 14a, the negative electrode active material layer 14b, the separator 13, the positive electrode active material layer 12b, and the positive electrode current collector 12a are stacked in this order is sandwiched between the facing surfaces of the folded exterior body 21 and sealed in the end portion by the adhesive layer and the sealing layers 15, and the rest of space surrounded by the exterior body 21 is filled with the electrolytic solution 19.

FIG. 3E illustrates an example of a schematic cross-sectional view of the altered-shape region 78 formed by processing the lead electrode 20 as described above. When a portion of the power storage unit 80 that is around the connection portion 20a is curved, the curvature of the altered-shape region 78 relatively increases, so that the curvature of the positive electrode tab portion 12t can be relatively decreased. That is, the lead electrode 20 connected to the positive electrode 12 includes the altered-shape region 78, whereby stress imposed on the positive electrode tab portion 12t when the portion around the connection portion 20a is curved can be relaxed. Similarly, when the lead electrode 20 connected to the negative electrode 14 includes the altered-shape region 78, stress imposed on the negative electrode tab portion 14t when the portion around the connection portion 20a is curved can be relaxed.

Note that FIG. 3E illustrates the structure where the positive electrode current collector 12a is not curved in the vicinity of the connection portion 20a and the exterior body 21 having facing surfaces between which the stack and the lead electrode 20 are sandwiched is curved along the stack and the lead electrode 20; however, one embodiment of the present invention is not limited to this structure. For example, the positive electrode current collector 12a may be curved such that the curvature of a portion of the exterior body 21 having facing surfaces between which the stack and the lead electrode 20 are sandwiched that is around the connection portion 20a is small.

[Modification Examples of Altered-Shape Region]

The altered-shape region 78 has a function of relaxing bending stress on a portion that is in the vicinity of and is physically connected to the altered-shape region 78. When the altered-shape region 78 includes a portion that can be curved or is easily curved, the effect achieved by the function can be increased.

An altered-shape region 79 that has a different structure from that of the altered-shape region 78 illustrated in FIG. 3E will be described below.

Figure 4A:
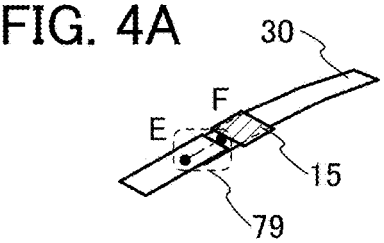
FIGS. 4A to 4K are perspective views and cross-sectional views each illustrating an example of a lead electrode.
Figure 4B:
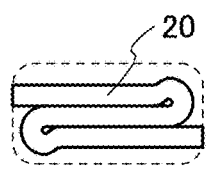
Figure 4C:
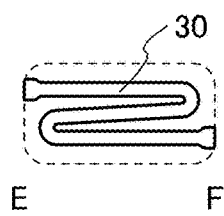

FIG. 4A is a perspective view of a lead electrode 30 that includes the altered-shape region 79 and is provided with the sealing layer 15. FIG. 4B is a cross-sectional view of the altered-shape region 78 illustrated in FIG. 3E. FIG. 4C is a cross-sectional view of the altered-shape region 79 along the dashed-dotted line E-F in FIG. 4A.

The altered-shape region 79 illustrated in FIG. 4C is obtained by performing 180° bending twice in a manner similar to that of the altered-shape region 78 illustrated in FIG. 4B; however, the thickness of the lead electrode 30 is smaller than that of the lead electrode 20. When the thickness of the altered-shape region 79 of the lead electrode 30 is smaller than that of the other region of the lead electrode 30, the altered-shape region 79 can relax stress more effectively.

A processing method to obtain the altered-shape region 79 illustrated in FIG. 4C is as follows. First, a portion to be an altered-shape region of the lead electrode 30 is polished or ground with a file or a grinder, or the lead electrode 30 is compressed in the thickness direction or stretched in the length direction so as to have a desired thickness, and after that, the 180° bending is performed.

Figure 4D:
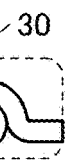

Alternatively, the altered-shape region 79 may have the structure illustrated in FIG. 4D. The altered-shape region 79 illustrated in FIG. 4D is obtained by performing 180° bending twice on two portions of the lead electrode 30. When the number of curved portions of the lead electrode 30 is increased, the altered-shape region 79 can relax bending stress on the whole lead electrode 30 more effectively. Note that 180° bending is performed twice on two portions in FIG. 4D, but may be performed on three or more portions. Alternatively, 180° bending may be performed three or more times on one portion.

Figure 4E:
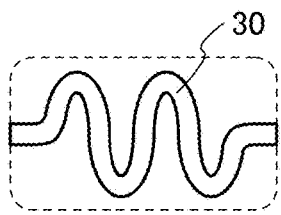

The altered-shape region 79 illustrated in FIG. 4E has a structure in which projections with top portions on one side of the lead electrode 30 and projections with top portions on the other side thereof are alternately provided. When the altered-shape region 79 is curved to have such a wave shape, the curvature radius of the projection can be increased; thus, even a material with a low tenacity that is used for the lead electrode 30 can be easily processed.

The altered-shape region 79 illustrated in FIG. 4E can be formed by hand or pressing such as embossing. Alternatively, a bonding die that is described later can be used to form the altered-shape region 79 illustrated in FIG. 4E.

Figure 4F:
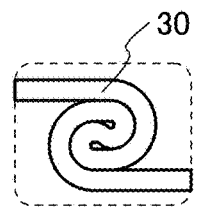

The altered-shape region 79 may have a spirally wound shape as illustrated in FIG. 4F. The altered-shape region 79 illustrated in FIG. 4F can be formed by performing 180° bending on the lead electrode 30 once and rolling it around the bent portion. Such a structure can reduce the volume of the altered-shape region 79 while increasing the number of curved portions of the altered-shape region 79.

Figure 4G:
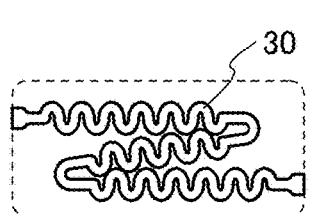

The altered-shape region 79 illustrated in FIG. 4G has a combination of the structure in FIG. 4C and the structure in FIG. 4E. Specifically, the altered-shape region 79 illustrated in FIG. 4G can be formed in such a manner that part of the lead electrode 30 is polished or ground to be reduced in thickness, a plurality of projections that form a fine wave shape are provided by embossing or the like, and then, 180° bending is performed twice.

Here, processing to form a wave shape that is coarse (that has large projections) compared with the wave shape formed first may be performed instead of 180° bending. That is to say, the altered-shape region 79 may have a fractal shape having projections, each projection including a plurality of smaller projections that have shapes similar to that of the projection. Such a structure can relax bending stress on the whole altered-shape region 79 more effectively and prevent bending stress from being locally applied to part of the altered-shape region 79.

In FIGS. 4B to 4G, the direction in which the lead electrode 30 is bent or curved in forming the altered-shape region includes the dashed-dotted line E-F in FIG. 4A and is parallel to a surface that is perpendicular to the upper surface of the lead electrode 30; however, one embodiment of the present invention is not limited to this example.

Figure 4H:
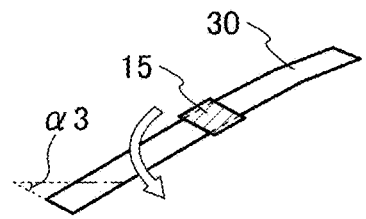

FIGS. 4H to 4K illustrate methods to form an altered-shape region 79a and an altered-shape region 79b. FIG. 4H is a perspective view illustrating the lead electrode 30 and the sealing layer 15 before formation of the altered-shape region.

Figure 4J:
Figure 4I:
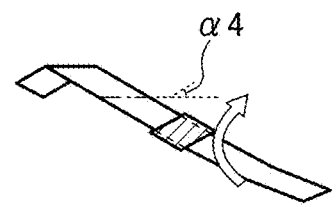

When the lead electrode 30 is folded along the dashed-dotted line in FIG. 4H in the direction indicated by the arrow, the shape of the lead electrode 30 is changed as illustrated in FIG. 4I. Similarly, when the lead electrode 30 is folded along the dashed-dotted line in FIG. 4I in the direction indicated by the arrow, the altered-shape region 79a is formed, and the shape of the lead electrode 30 is obtained as illustrated in FIG. 4J.

The folding direction in FIG. 4H can be determined by an angle $\alpha 3$ formed by a straight line parallel to a shorter side of the lead electrode 30 and a straight line extending from a fold line (the dashed-dotted line in FIG. 4H). The folding direction in FIG. 4I can be determined by an angle $\alpha 4$ formed by a straight line parallel to a shorter side of the lead electrode 30 and a straight line extending from a fold line (the dashed-dotted line in FIG. 4I). In FIGS. 4H and 4I, the angles $\alpha 3$ and $\alpha 4$ are both 45°. When the sum of the angles $\alpha 3$ and $\alpha 4$ is 90°, the extending direction of the lead electrode 30 from the altered-shape region 79a can be parallel to the extending direction of the lead electrode 30 where a folded portion has not been formed (hereinafter referred to as the initial extending direction). Furthermore, the angles $\alpha 3$ and $\alpha 4$ can be determined appropriately in accordance with the direction in which the lead electrode 30 is desired to extend.

Figure 4K:
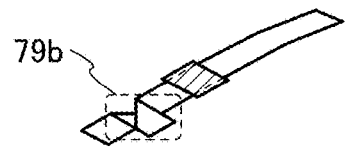

When the lead electrode 30 is folded along the dashed-dotted line in FIG. 4J in the direction indicated by the arrow, the altered-shape region 79b is formed, and the shape of the lead electrode 30 is changed as illustrated in FIG. 4K. The fold line shown in FIG. 4J is parallel to the initial extending direction and passes through the middle point of a line connecting the middle points of the fold lines shown in FIGS. 4H and 4I; thus, the extending direction of the whole lead electrode 30 provided with the altered-shape region 79b can be in line with the initial extending direction.

The folds in FIGS. 4H to 4J can be a 180° bend, for example. FIGS. 4H to 4J each illustrate an example in which the lead electrode 30 is folded inward; however, one embodiment of the present invention is not limited to this example. The fold in FIGS. 4H to 4J may be either an outward fold or an inward fold.

When the lead electrode 30 is provided with the altered-shape region 79a or the altered-shape region 79b, bending stress on a portion in the vicinity of the altered-shape region physically connected to the altered-shape region can be relaxed. Furthermore, the altered-shape region 79a or the altered-shape region 79b can relax bending stress applied from various directions in accordance with the direction in which the lead electrode 30 is folded or curved as illustrated as examples in FIGS. 4H to 4J.

This embodiment can be implemented in combination with any of the other embodiments and example as appropriate.

Embodiment 3

In this embodiment, an example of a power storage unit that is different from the power storage unit described in Embodiment 1 or 2 in using an embossed exterior body will be described.

First, embossing, which is a kind of pressing, will be described.

Figure 5A:
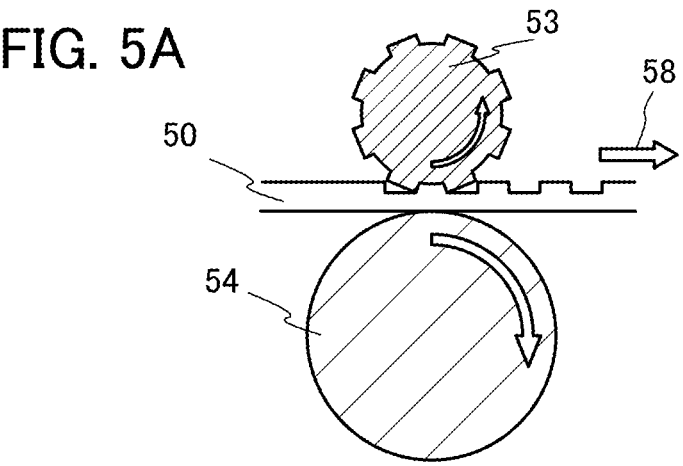
FIGS. 5A to 5C each illustrate embossing.
Figure 5B:
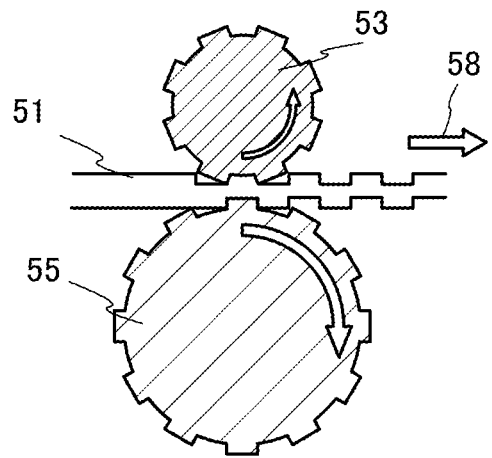
Figure 5C:
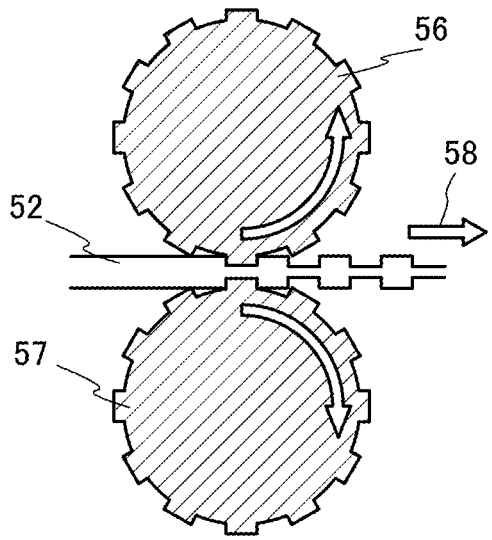

FIGS. 5A to 5C are cross-sectional views each showing an example of embossing. Note that embossing refers to processing for forming unevenness on a surface of a film by bringing an embossing roll whose surface has unevenness into contact with the film with pressure. The embossing roll is a roll whose surface is patterned.

An example where one surface of a film is embossed is illustrated in FIG. 5A. Note that embossing may be performed on the metal sheet described above or performed on an exterior body after the metal sheet is cut.

FIG. 5A illustrates the state where a film 50 is sandwiched between an embossing roll 53 in contact with the one surface of the film and a roll 54 in contact with the other surface and the film 50 is being transferred in a direction 58 of movement of the film 50. The surface of the film is patterned by pressure or heat.

Processing illustrated in FIG. 5A is called one-side embossing performed by a combination of the embossing roll 53 and the roll 54 (a metal roll or an elastic roll (e.g., rubber roll)).

An example where both surfaces of a film are embossed is illustrated in FIG. 5B.

FIG. 5B illustrates the state where a film 51 is sandwiched between the embossing roll 53 in contact with one surface of the film and an embossing roll 55 in contact with the other surface and the film 51 is being transferred in the direction 58 of movement of the film 51.

Processing illustrated in FIG. 5B is called both-side embossing performed by a combination of the embossing roll 53 and the embossing roll 55, which are a couple of embossing rolls.

The surface of the film 51 is patterned by unevenness, that is, projections for concaving part of the surface of the film and depressions for convexing part of the surface of the film that are alternately provided.

FIG. 5C illustrates the state where a film 52 is sandwiched between an embossing roll 56 in contact with one surface of the film and an embossing roll 57 in contact with the other surface and the film 52 is being transferred in the direction 58 of movement of the film 52.

Processing illustrated in FIG. 5C is called Tip to Tip both-side embossing performed by a combination of the embossing roll 56 and the embossing roll 57 that has the same pattern as the embossing roll 56. The phases of the projections and depressions of the two embossing rolls are the same, so that substantially the same pattern can be formed on the top surface and bottom surface of the film 52.

The embossing roll is not necessarily used, and an embossing plate may be used. Furthermore, embossing is not necessarily employed, and any method that allows formation of a relief on part of the film can be employed.

Figure 6A:
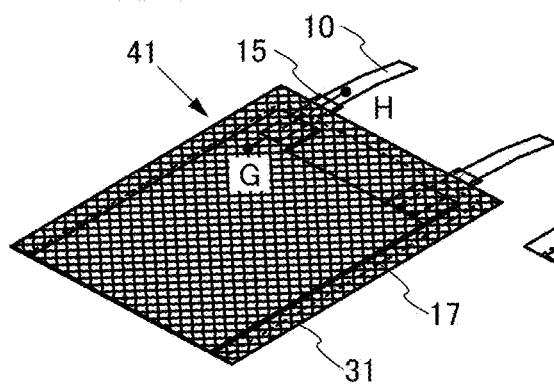
FIGS. 6A to 6D are perspective views and cross-sectional views illustrating power storage units of embodiments of the present invention.
Figure 6B:
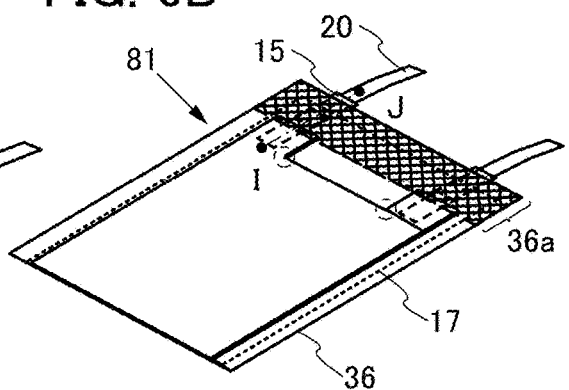
Figure 6C:
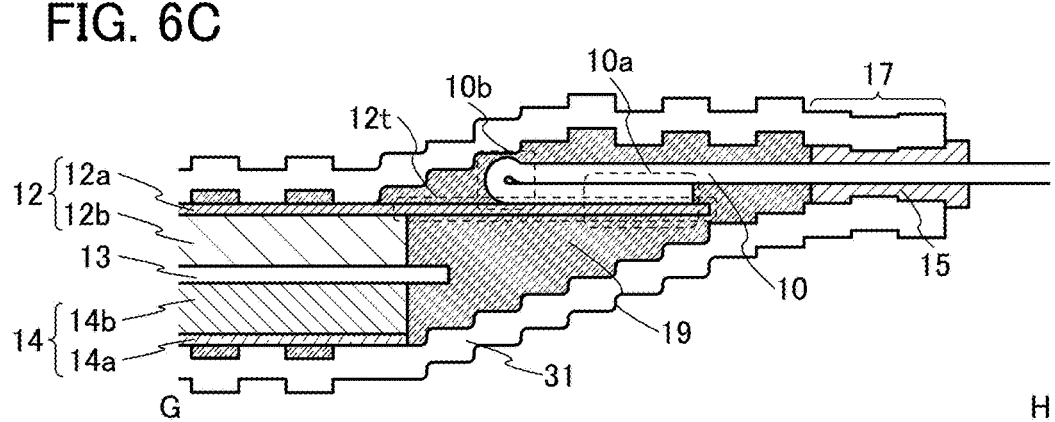
Figure 6D:
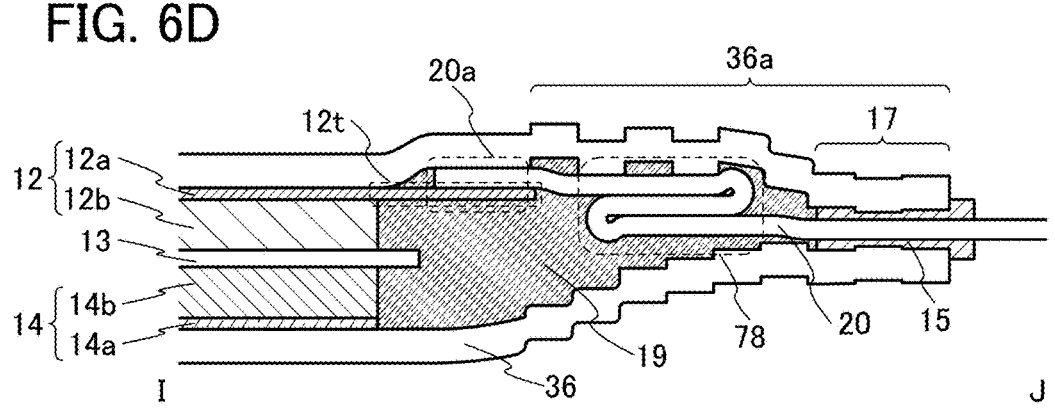

FIGS. 6A to 6D illustrate examples of power storage units that are different from the power storage unit described in Embodiment 1 or 2 in using an embossed exterior body. FIG. 6A is a perspective view of a power storage unit 41 that is different from the power storage unit 40 in using an entirely embossed exterior body 31 instead of the exterior body 11. FIG. 6C is a cross-sectional view along the dashed-dotted line G-H in FIG. 6A. FIG. 6B is a perspective view of a power storage unit 81 that is different from the power storage unit 80 in using a partly embossed exterior body 36 instead of the exterior body 11. FIG. 6D is a cross-sectional view along the dashed-dotted line I-J in FIG. 6B.

The power storage unit 41 includes the entirely embossed exterior body 31 (see FIGS. 6A and 6C). The exterior body 31 is provided with a plurality of projections or depressions. The plurality of projections or depressions may relax stress on the exterior body 31 that is caused when external force is applied thereto. The plurality of projections or depressions can be formed by both-side embossing illustrated in FIG. 5B, for example.

When the exterior body has low flexibility, a fold portion or an altered-shape region of a lead electrode of the power storage unit of one embodiment of the present invention cannot relax stress in some cases. Specifically, when the flexibility of the exterior body is lower than that of the positive electrode 12 (or the negative electrode 14) or the lead electrode, the exterior body might limit the bendability of a portion of the power storage unit that is around the fold portion or the altered-shape region. In such a case, the use of the exterior body 31 having high flexibility as a result of embossing the entire exterior body as in the power storage unit 41 can achieve the effect of relaxing stress.

Moreover, increasing the flexibility of only a portion of the exterior body that overlaps with the fold portion or the altered-shape region can further increase the effect. The power storage unit 81 illustrated in FIGS. 6B and 6D includes the exterior body 36 provided with, only in a region 36a, projections or depressions similar to those of the exterior body 31. The region 36a is located in a position that overlaps with the altered-shape region 78 and does not overlap with the roots of the positive electrode tab portion 12t and the negative electrode tab portion 14t (regions surrounded by circles in FIG. 6B). With such a structure, when the whole power storage unit 81 is curved, the altered-shape region 78 is greatly curved together with the region 36a of the exterior body 36, relaxing stress on the roots of the positive electrode tab portion 12t and the negative electrode tab portion 14t.

The pattern with projections or depressions of the exterior body 36 or the exterior body 31 is a geometric pattern which can be visually recognized and in which lines slanted in two directions cross each other, for example (see FIGS. 6A and 6B). In the case of such a geometric pattern in which lines slanted in two directions cross each other, stress due to bending can be relieved in at least two directions. The projections or depressions are not necessarily arranged regularly and may be arranged randomly. Random arrangement enables stress due to not only two-dimensional bending but stress due to three-dimensional random bending or twisting to be relieved. The film may partly include a plurality of regions having different patterns.

Furthermore, the size of the projections or depressions of the exterior body may be different between the end portion and the center portion, that is, between the thermocompression-bonded region 17 and the other region. When the projections or depressions in the end portion of the exterior body are smaller than those in the center portion, capability of sealing of the power storage unit by thermocompression bonding can be prevented from being lowered.

This embodiment can be implemented in combination with any of the other embodiments as appropriate.

Embodiment 4

In this embodiment, an example where a plurality of combinations of stacked layers that are partly different from those in Embodiment 1 is provided inside the folded exterior body 11 will be described.

Figure 7A:
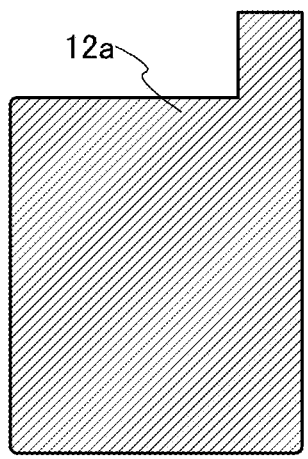
FIGS. 7A to 7E are views illustrating a fabricating process of a power storage unit of one embodiment of the present invention.
Figure 7B:
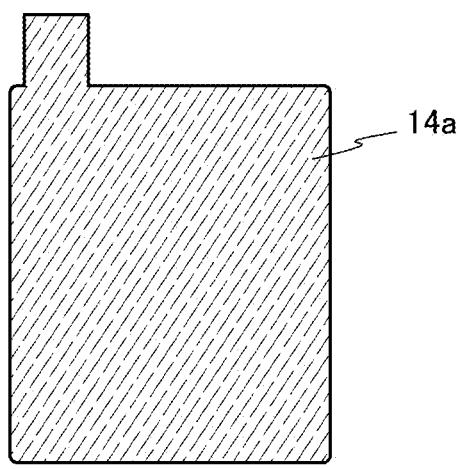
Figure 7C:
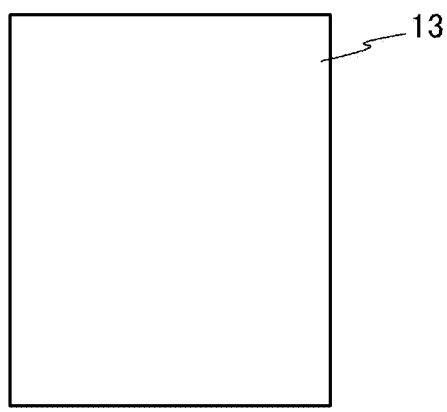
Figure 7D:
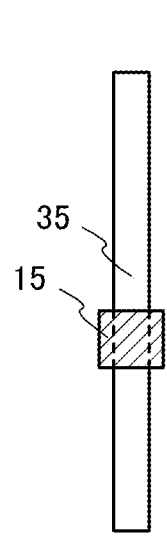
Figure 7E:
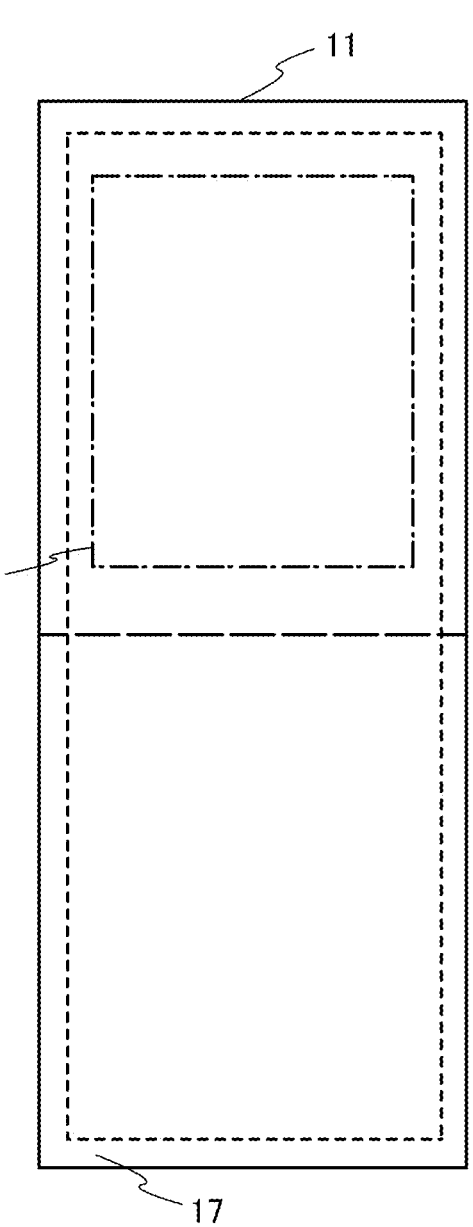

FIG. 7A is a top view of the positive electrode current collector 12a. FIG. 7B is a top view of the negative electrode current collector 14a. FIG. 7C is a top view of the separator 13. FIG. 7D is a top view of the lead electrode 35. FIG. 7E is a top view of the exterior body 11.

The dimensions of the positive electrode current collector, the negative electrode current collector, and the separator are substantially the same in FIGS. 7A to 7C. A region 16 surrounded by the dashed-dotted line in FIG. 7E has substantially the same dimension as the separator 13 in FIG. 7C. A region between the dotted line and the edge in FIG. 7E is the thermocompression-bonded region 17.

Figure 8A:
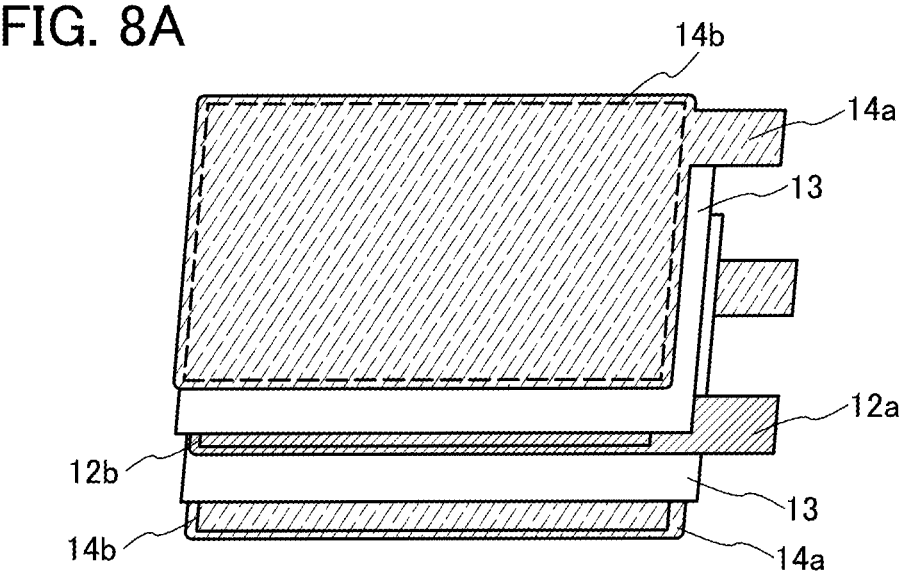
FIGS. 8A and 8B are views illustrating a fabricating process of a power storage unit of one embodiment of the present invention.

FIG. 8A is a perspective view of two combinations. Note that the positive electrode current collector 12a is sandwiched between the positive electrode active material layers 12b (the positive electrode active material layer 12b provided on the back surface side (the downward-facing surface side in the drawing) is not illustrated). Specifically, the negative electrode current collector 14, a negative electrode active material layer, the separator 13, a positive electrode active material layer, the positive electrode current collector 12a, a positive electrode active material layer, the separator, a negative electrode active material layer, the negative electrode current collector are stacked in this order. Although two separators are illustrated in FIG. 8A, one separator may be folded and the positive electrode current collector 12a may be placed inside the folded separator.

Figure 8B:
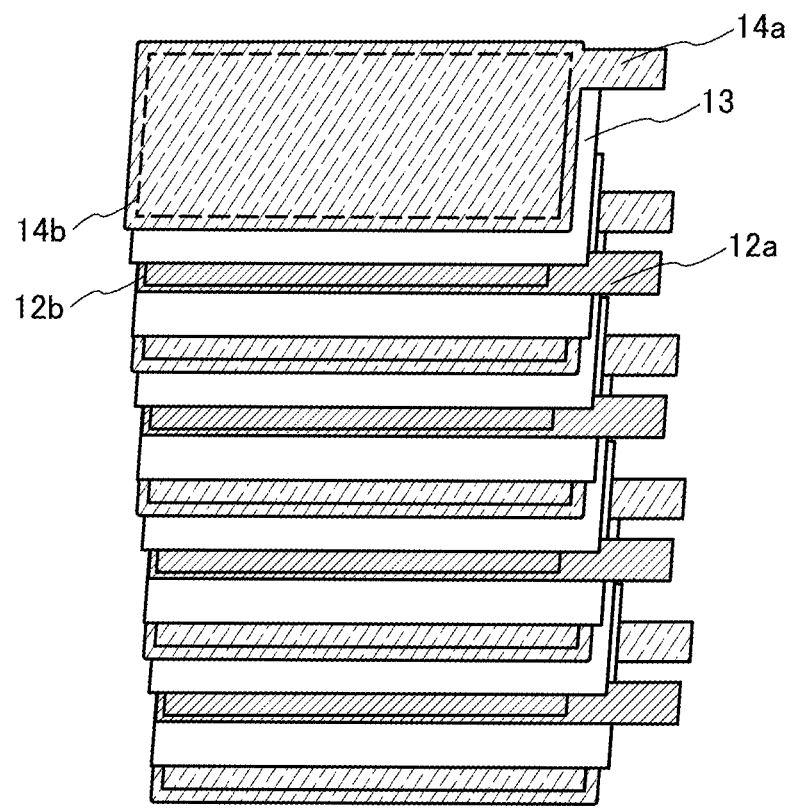

The negative electrode current collector 14a may be sandwiched between the negative electrode active material layers 14b. FIG. 8B illustrates an example of a power storage unit where three negative electrode current collectors 14a each sandwiched between the negative electrode active material layers 14b, four positive electrode current collectors 12a each sandwiched between the positive electrode active material layers 12b, and eight separators 13 are sandwiched between two negative electrode current collectors 14a each having one surface that is provided with the negative electrode active material layer 14b.

In the case of thus stacking layers, four positive electrode current collectors 12a are all fixed and electrically connected at a time by ultrasonic welding. Furthermore, when ultrasonic welding is performed with the four positive electrode current collectors 12a overlapping with the lead electrode 35, they can be electrically connected efficiently.

A protruding portion of the positive electrode current collector 12a is also called a tab portion. Ultrasonic welding can be performed in such a manner that ultrasonic waves are emitted to the tab portion of the positive electrode current collector 12a placed so as to overlap with a tab portion of another positive electrode current collector, while pressure is applied thereto.

The tab portion is likely to be cracked or cut by stress due to external force applied after fabrication of a power storage unit.

Figure 9A:
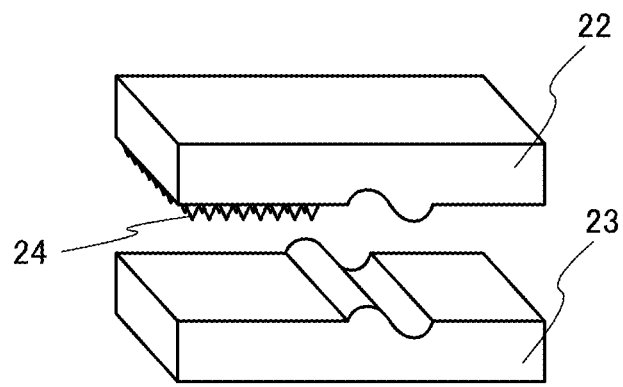
FIGS. 9A and 9B are views illustrating a fabricating process of a power storage unit of one embodiment of the present invention.

Thus, an ultrasonic welding apparatus including bonding dies illustrated in FIG. 9A is used in this embodiment. Note that only top and bottom bonding dies of the ultrasonic welding apparatus are illustrated in FIG. 9A for simplicity.

Figure 9B:
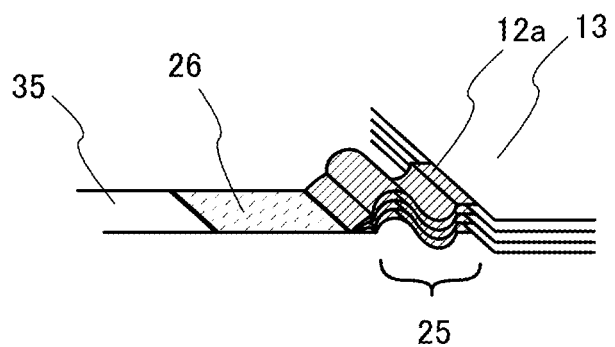

Tab portions of four positive electrode current collectors 12a and the lead electrode 35 are positioned between a first bonding die 22 provided with projections 24 and a second bonding die 23. When ultrasonic welding is performed with a region that needs to be welded overlapping with the projections 24 and pressure is applied, a bent portion 25 is formed in the tab portion between a welded region 26 and a region of the tab portion protruding from an end portion of the separator 13, as illustrated in FIG. 9B.

This bent portion 25 can relieve stress due to external force applied after fabrication of a power storage unit. Such a structure as can relieve a strain caused by stress can prevent the secondary battery (e.g., an exterior body) from being damaged when changed in form by being bent, for example, achieving long-time reliability.

Furthermore, the ultrasonic welding apparatus including the bonding dies illustrated in FIG. 9A can perform ultrasonic welding and form the bent portion 25 at a time; thus, a power storage unit can be fabricated without increasing the number of fabricating steps. Note that ultrasonic welding and forming the bent portion 25 may be separately performed.

In addition, tab portions of five negative electrode current collectors are also all welded to be electrically connected by ultrasonic welding described above.

This embodiment can be implemented in combination with any of the other embodiments as appropriate.

Embodiment 5

In this embodiment, examples of electronic devices each incorporating the power storage unit obtained using any one of Embodiments 1 to 4 will be described.

Examples of electronic devices each using a power storage unit are as follows: display devices (also referred to as televisions or television receivers) such as head-mounted displays and goggle type displays, desktop personal computers, laptop personal computers, monitors for computers or the like, cameras such as digital cameras or digital video cameras, digital photo frames, electronic notebooks, e-book readers, electronic translators, toys, audio input devices such as microphones, electric shavers, electric toothbrushes, high-frequency heating appliances such as microwave ovens, electric rice cookers, electric washing machines, electric vacuum cleaners, water heaters, electric fans, hair dryers, air-conditioning systems such as humidifiers, dehumidifiers, and air conditioners, dishwashers, dish dryers, clothes dryers, futon dryers, electric refrigerators, electric freezers, electric refrigerator-freezers, freezers for preserving DNA, flashlights, electric power tools, alarm devices such as smoke detectors, gas alarm devices, and security alarm devices, industrial robots, health equipment and medical equipment such as hearing aids, cardiac pacemakers, X-ray equipment, radiation counters, electric massagers, and dialyzers, mobile phones (also referred to as mobile phone devices or cell phones), portable game machines, portable information terminals, lighting devices, headphone stereos, stereos, remote controls, clocks such as table clocks and wall clocks, cordless phone handsets, transceivers, pedometers, calculators, portable or stationary music reproduction devices such as digital audio players, and large game machines such as pachinko machines.

The power storage unit fabricated according to any one of Embodiments 1 to 4 includes, as an exterior body, a thin film having flexibility and thus can be bonded to a support structure body with a curved surface and can change its form reflecting the curved surface of a region of the support structure body that has a large radius of curvature.

In addition, a flexible power storage unit can be incorporated along a curved inside/outside wall surface of a house or a building or a curved interior/exterior surface of an automobile.

Figure 10A:
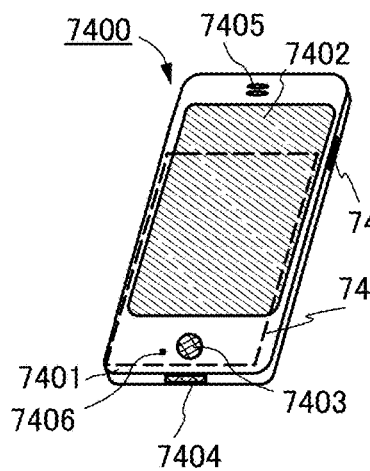
FIGS. 10A to 10H illustrate examples of electronic devices.

FIG. 10A illustrates an example of a mobile phone. A mobile phone 7400 includes a display portion 7402 incorporated in a housing 7401, an operation button 7403, an external connection port 7404, a speaker 7405, a microphone 7406, and the like. Note that the mobile phone 7400 includes a power storage unit 7407.

Figure 10B:
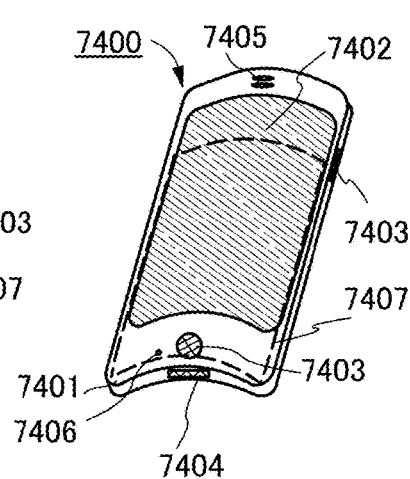
Figure 10C:
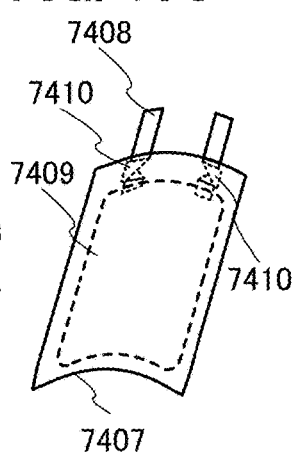

FIG. 10B illustrates the mobile phone 7400 that is bent. When the whole mobile phone 7400 is bent by external force, the power storage unit 7407 included in the mobile phone 7400 is also bent. FIG. 10C illustrates the bent power storage unit 7407. The power storage unit 7407 is a laminated storage battery (also referred to as a layered battery or a film-covered battery). The power storage unit 7407 is fixed while being bent. Note that the power storage unit 7407 includes a lead electrode 7408 electrically connected to a current collector 7409. For example, the lead electrode 7408 is provided with an altered-shape region 7410 as described in Embodiment 2, so that the power storage unit 7407 has high reliability even when bent. The mobile phone 7400 may further be provided with a slot for insertion of a SIM card, a connector portion for connecting a USB device such as a USB memory.

Figure 10D:
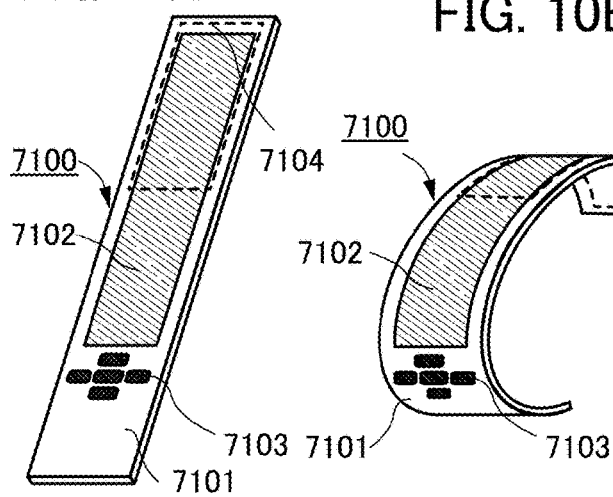
Figure 10E:
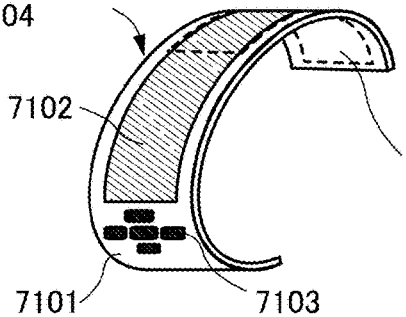
Figure 10F:
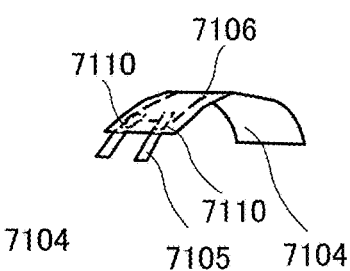

FIG. 10D illustrates an example of a mobile phone that can be bent. When bent to be put around a forearm, the mobile phone can be used as a bangle-type mobile phone as in FIG. 10E. A mobile phone 7100 includes a housing 7101, a display portion 7102, an operation button 7103, and a power storage unit 7104. FIG. 10F illustrates the power storage unit 7104 that can be bent. When the mobile phone is worn on a user's arm while the power storage unit 7104 is bent, the housing changes its form and the curvature of a part or the whole of the power storage unit 7104 is changed. Specifically, a part or the whole of the housing or the main surface of the power storage unit 7104 is changed in the range of radius of curvature from 10 mm to 150 mm. Note that the power storage unit 7104 includes a lead electrode 7105 that is electrically connected to a current collector 7106. For example, the lead electrode 7105 is provided with a fold portion 7110 as described in Embodiment 1, so that the power storage unit 7104 can retain high reliability even when the power storage unit 7104 is bent many times with different curvatures. As described above, the mobile phone illustrated in FIG. 10D can be changed in form in more than one way, and it is desirable that at least the housing 7101, the display portion 7102, and the power storage unit 7104 have flexibility in order to change the form of the mobile phone.

The mobile phone 7100 may further be provided with a slot for insertion of a SIM card, a connector portion for connecting a USB device such as a USB memory.

Figure 10G:
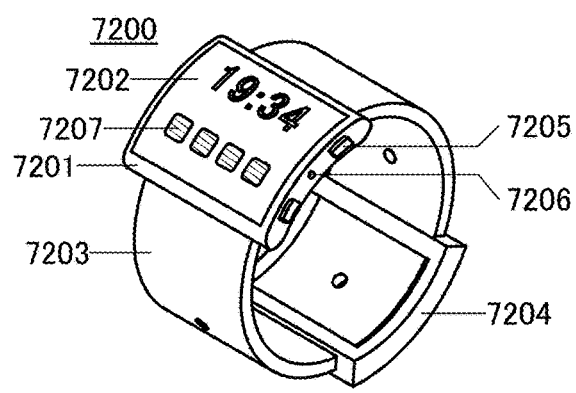

FIG. 10G illustrates an example of a watch-type portable information terminal. A portable information terminal 7200 includes a housing 7201, a display portion 7202, a band 7203, a buckle 7204, an operation button 7205, an input output terminal 7206, and the like.

The portable information terminal 7200 is capable of executing a variety of applications such as mobile phone calls, e-mailing, viewing and editing texts, music reproduction, Internet communication, and a computer game.

The display surface of the display portion 7202 is curved, and images can be displayed on the curved display surface. In addition, the display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as time setting, on/off of the power, on/off of wireless communication, setting and cancellation of a silent mode, and setting and cancellation of a power saving mode can be performed. For example, the functions of the operation button 7205 can be set freely by setting the operating system incorporated in the portable information terminal 7200.

The portable information terminal 7200 can employ near field communication that is a communication method based on an existing communication standard. In that case, for example, mutual communication between the portable information terminal 7200 and a headset capable of wireless communication can be performed, and thus hands-free calling is possible.

Moreover, the portable information terminal 7200 includes the input output terminal 7206, and data can be directly transmitted to and received from another information terminal via a connector. In addition, charging via the input output terminal 7206 is possible. Note that the charging operation may be performed by wireless power feeding without using the input output terminal 7206.

The portable information terminal 7200 is provided with the power storage device of one embodiment of the present invention. For example, the power storage unit 7104 illustrated in FIG. 10F that is in the state of being curved can be provided in the housing 7201. Alternatively, the power storage unit 7104 illustrated in FIG. 10F can be provided in the band 7203 such that it can be curved.

Figure 10H:
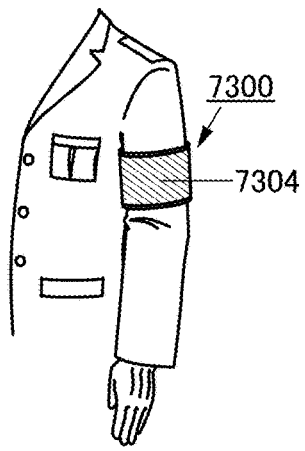

FIG. 10H illustrates an example of an armband display device. A display device 7300 includes a display portion 7304 and the power storage device of one embodiment of the present invention. The display device 7300 can include a touch sensor in the display portion 7304 and can serve as a portable information terminal.

The display surface of the display portion 7304 is curved, and images can be displayed on the curved display surface. A display state of the display device 7300 can be changed by, for example, near field communication, which is a communication method based on an existing communication standard.

The display device 7300 includes an input output terminal, and data can be directly transmitted to and received from another information terminal via a connector. In addition, charging via the input output terminal is possible. Note that the charging operation may be performed by wireless power feeding without using the input output terminal.

The use of power storage units that can be bent in vehicles enables production of next-generation clean energy vehicles such as hybrid electric vehicles (HEVs), electric vehicles (EVs), and plug-in hybrid electric vehicles (PHEVs). Moreover, power storage units that can be bent can also be used in moving objects such as agricultural machines, motorized bicycles including motor-assisted bicycles, motorcycles, electric wheelchairs, electric carts, boats or ships, submarines, aircrafts such as fixed-wing aircrafts and rotary-wing aircrafts, rockets, artificial satellites, space probes, planetary probes, and spacecrafts.

Figure 11A:
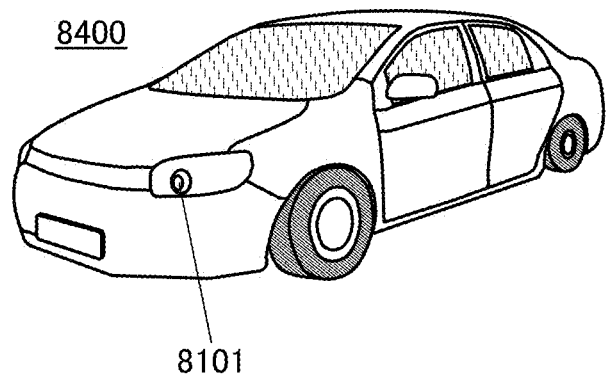
FIGS. 11A and 11B illustrate examples of electronic apparatus.
Figure 11B:
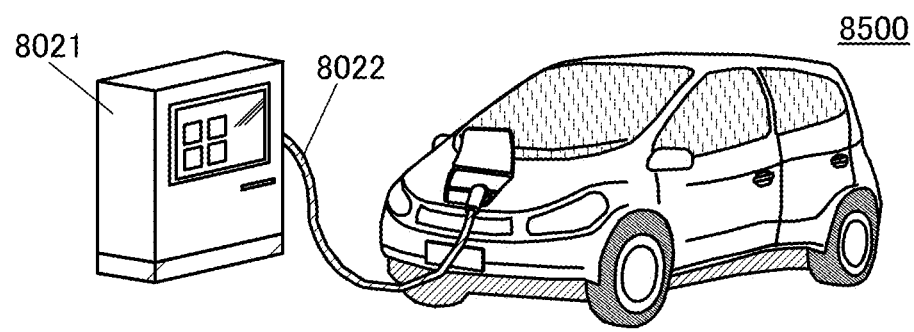
Figure 12A:
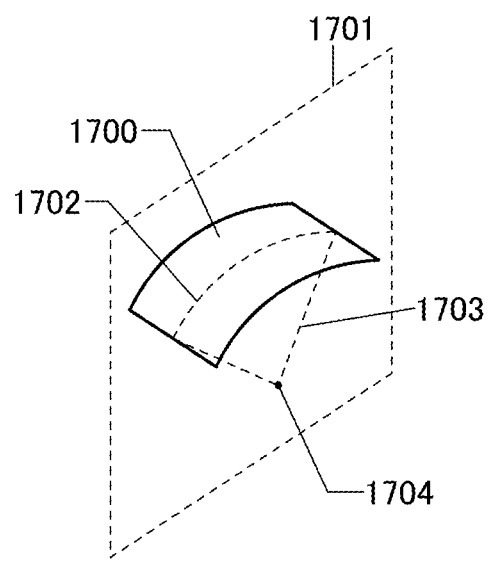
FIGS. 12A to 12C illustrate the radius of curvature of a surface.
Figure 12B:
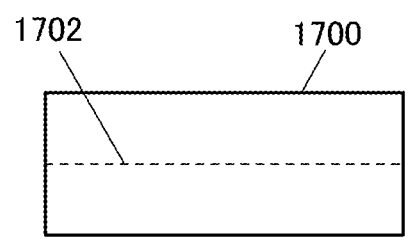
Figure 12C:
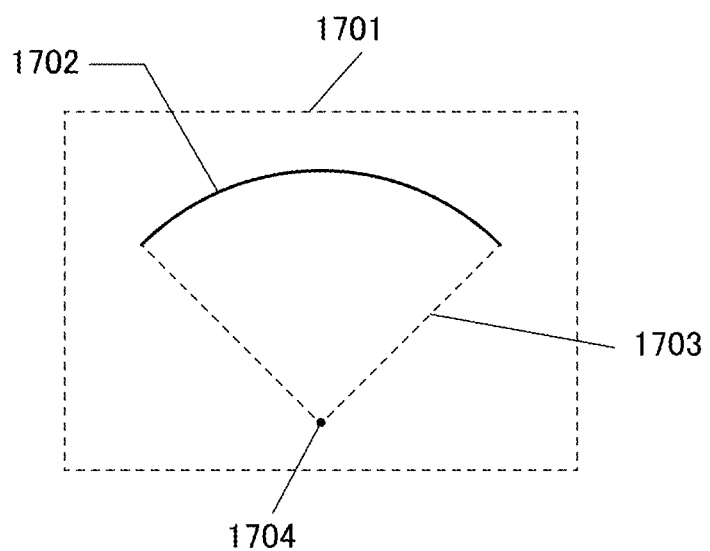
Figure 13A:
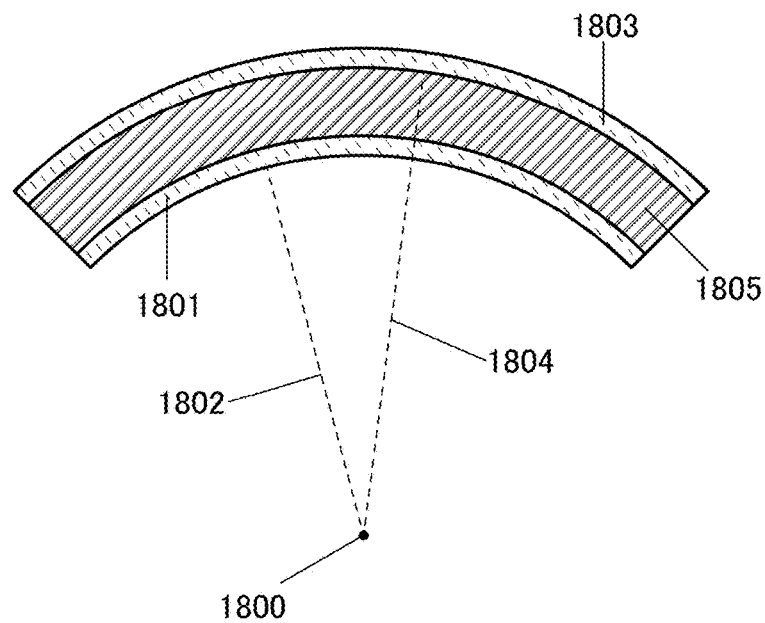
FIGS. 13A to 13D illustrate the center of curvature.
Figure 13B:
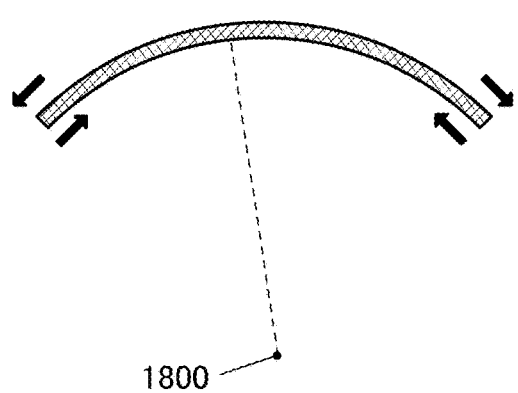
Figure 13C:
Figure 13D:

FIGS. 11A and 11B each illustrate an example of a vehicle using one embodiment of the present invention. An automobile 8400 illustrated in FIG. 11A is an electric vehicle that runs on the power of an electric motor. Alternatively, the automobile 8400 is a hybrid electric vehicle capable of driving appropriately using either the electric motor or the engine. One embodiment of the present invention can provide a high-mileage vehicle. The automobile 8400 includes the power storage device. The power storage device is used not only for driving the electric motor, but also for supplying electric power to a light-emitting device such as a headlight 8401 or a room light (not illustrated).

The power storage device can also supply electric power to a display device of a speedometer, a tachometer, or the like included in the automobile 8400. Furthermore, the power storage device can supply electric power to a semiconductor device included in the automobile 8400, such as a navigation system.

FIG. 11B illustrates an automobile 8500 including the power storage device. The automobile 8500 can be charged when the power storage device is supplied with electric power through external charging equipment by a plug-in system, a contactless power feeding system, or the like. In FIG. 11B, a power storage device included in the automobile 8500 is charged with the use of a ground-based charging apparatus 8021 through a cable 8022. In charging, a given method such as CHAdeMO (registered trademark) or Combined Charging System may be employed as a charging method, the standard of a connector, or the like as appropriate. The ground-based charging apparatus 8021 may be a charging station provided in a commerce facility or a power source in a house. For example, with the use of a plug-in technique, the power storage device included in the automobile 8500 can be charged by being supplied with electric power from outside. The charging can be performed by converting AC electric power into DC electric power through a converter such as an AC-DC converter.

Furthermore, although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charging can be performed not only when the electric vehicle is stopped but also when driven. In addition, the contactless power feeding system may be utilized to perform transmission and reception of electric power between vehicles. Furthermore, a solar cell may be provided in the exterior of the automobile to charge the power storage device when the automobile stops or moves. To supply electric power in such a contactless manner, an electromagnetic induction method or a magnetic resonance method can be used.

According to one embodiment of the present invention, the power storage device can be efficiently provided in an internal space of a vehicle. Thus, the power storage device with high capacity can be provided in a limited space in the vehicle, and the driving distance of the vehicle per charge can be increased. Furthermore, the power storage device included in the vehicle can be used as a power source for supplying electric power to products other than the vehicle. In such a case, the use of a commercial power source can be avoided at peak time of electric power demand.

This embodiment can be implemented in combination with any of the other embodiments and example as appropriate.

Embodiment 6

A battery management unit (BMU) that can be used in combination with battery cells each including the materials described in the above embodiment and transistors that are suitable for a circuit included in the battery management unit will be described with reference to FIGS. 14 to 20. In this embodiment, in particular, a battery management unit of a power storage device including battery cells connected in series will be described.

When the plurality of battery cells connected in series are repeatedly charged and discharged, there occur variations in charge and discharge characteristics among the battery cells, which causes variations in capacity (output voltage) among the battery cells. The discharge capacity of all the plurality of battery cells connected in series depends on the capacity of the battery cell that is low. The variations in capacity among the battery cells reduce the discharge capacity of all the battery cells. Furthermore, when charge is performed based on the capacity of the battery cell that is low, the battery cells might be undercharged. In contrast, when charge is performed based on the capacity of the battery cell that is high, the battery cells might be overcharged.

Thus, the battery management unit of the power storage device including the battery cells connected in series has a function of reducing variations in capacity among the battery cells, which cause an undercharge and an overcharge. Examples of a circuit configuration for reducing variations in capacity among battery cells include a resistive type, a capacitive type, and an inductive type, and a circuit configuration that can reduce variations in capacity among battery cells using transistors with a low off-state current will be explained here as an example.

A transistor including an oxide semiconductor in its channel formation region (an OS transistor) is preferably used as the transistor with a low off-state current. When an OS transistor with a low off-state current is used in the circuit of the battery management unit of the power storage device, the amount of charge that leaks from a battery can be reduced, and reduction in capacity with the lapse of time can be suppressed.

As the oxide semiconductor used in the channel formation region, an In-M-Zn oxide (M is Ga, Sn, Y, Zr, La, Ce, or Nd) is used. In the case where the atomic ratio of the metal elements of a target for forming an oxide semiconductor film is In:M:Zn=$x_1$:$y_1$:$z_1$, $x_1/y_1$ is preferably greater than or equal to ⅓ and less than or equal to 6, more preferably greater than or equal to 1 and less than or equal to 6, and $z_1/y_1$ is preferably greater than or equal to ⅓ and less than or equal to 6, more preferably greater than or equal to 1 and less than or equal to 6. Note that when $z_1/y_1$ is greater than or equal to 1 and less than or equal to 6, a CAAC-OS film as the oxide semiconductor film is easily formed.

Here, the details of the CAAC-OS film will be described.

A CAAC-OS film is one of oxide semiconductor films having a plurality of c-axis aligned crystal parts.

In a combined analysis image (also referred to as a high-resolution TEM image) of a bright-field image and a diffraction pattern of a CAAC-OS film, which is obtained using a transmission electron microscope (TEM), a plurality of crystal parts can be observed. However, in the high-resolution TEM image, a boundary between crystal parts, that is, a grain boundary is not clearly observed. Thus, in the CAAC-OS film, a reduction in electron mobility due to the grain boundary is less likely to occur.

According to the high-resolution cross-sectional TEM image of the CAAC-OS film observed in the direction substantially parallel to the sample surface, metal atoms are arranged in a layered manner in the crystal parts. Each metal atom layer reflects unevenness of a surface over which the CAAC-OS film is formed (hereinafter, a surface over which the CAAC-OS film is formed is referred to as a formation surface) or the top surface of the CAAC-OS film, and is arranged parallel to the formation surface or the top surface of the CAAC-OS film.

On the other hand, according to the plan high-resolution TEM image of the CAAC-OS film observed in the direction substantially perpendicular to the sample surface, metal atoms are arranged in a triangular or hexagonal arrangement in the crystal parts. However, there is no regularity of arrangement of metal atoms between different crystal parts.

For example, when the structure of a CAAC-OS including an $InGaZnO_4$ crystal is analyzed by an out-of-plane method using an X-ray diffraction (XRD) apparatus, a peak may appear at a diffraction angle (2θ) of around 31°. This peak is derived from the (009) plane of the $InGaZnO_4$ crystal, which indicates that crystals in the CAAC-OS film have c-axis alignment, and that the c-axes are aligned in the direction substantially perpendicular to the formation surface or the top surface of the CAAC-OS film.

Note that in analysis of the CAAC-OS film by an out-of-plane method, another peak may appear when 2θ is around 36°, in addition to the peak at 2θ of around 31°. The peak at 2θ of around 36° indicates that a crystal having no c-axis alignment is included in part of the CAAC-OS film. It is preferable that in the CAAC-OS film, a peak appear when 2θ is around 31° and that a peak not appear when 2θ is around 36°.

The CAAC-OS film is an oxide semiconductor film with low impurity concentration. The impurity is an element other than the main components of the oxide semiconductor film, such as hydrogen, carbon, silicon, or a transition metal element. In particular, an element (specifically, silicon or the like) having higher strength of bonding to oxygen than a metal element included in an oxide semiconductor film extracts oxygen from the oxide semiconductor film, which results in disorder of the atomic arrangement and reduced crystallinity of the oxide semiconductor film. Furthermore, a heavy metal such as iron or nickel, argon, carbon dioxide, or the like has a large atomic radius (molecular radius), and thus disturbs the atomic arrangement of the oxide semiconductor film and causes a decrease in crystallinity when it is contained in the oxide semiconductor film. Note that the impurity contained in the oxide semiconductor might serve as a carrier trap or a carrier generation source.

The CAAC-OS film is an oxide semiconductor having a low density of defect states. In some cases, oxygen vacancies in the oxide semiconductor film serve as carrier traps or serve as carrier generation sources when hydrogen is captured therein, for example.

The state in which impurity concentration is low and density of defect states is low (the number of oxygen vacancies is small) is referred to as a "highly purified intrinsic" or "substantially intrinsic" state. A highly purified intrinsic or substantially intrinsic oxide semiconductor has few carrier generation sources, and thus can have a low carrier density. Therefore, a transistor including the oxide semiconductor film rarely has negative threshold voltage (is rarely normally on). The highly purified intrinsic or substantially intrinsic oxide semiconductor film has few carrier traps. Accordingly, the transistor including the oxide semiconductor film has little variation in electrical characteristics and high reliability. Charge trapped by the carrier traps in the oxide semiconductor film takes a long time to be released and might behave like fixed charge. Thus, the transistor including the oxide semiconductor film having high impurity concentration and a high density of defect states has unstable electrical characteristics in some cases.

With the use of the CAAC-OS film in a transistor, variation in the electrical characteristics of the transistor due to irradiation with visible light or ultraviolet light is small.

Since the OS transistor has a wider band gap than a transistor including silicon in its channel formation region (a Si transistor), dielectric breakdown is unlikely to occur when a high voltage is applied. Although a voltage of several hundreds of volts is generated when battery cells are connected in series, the above-described OS transistor is suitable for a circuit of a battery management unit which is used for such battery cells in the power storage device.

Figure 14:
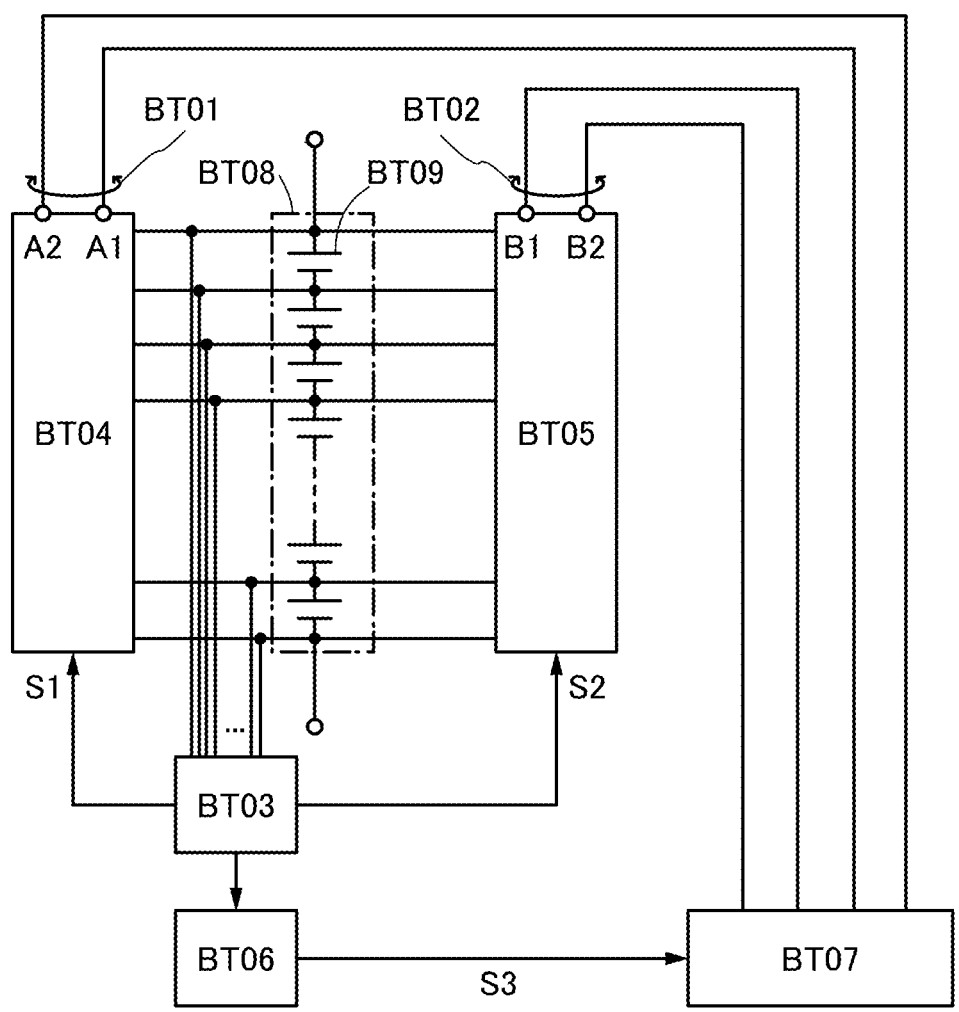
FIG. 14 is a block diagram illustrating one embodiment of the present invention.

FIG. 14 is an example of a block diagram of the power storage device. A power storage device BT00 illustrated in FIG. 14 includes a terminal pair BT01, a terminal pair BT02, a switching control circuit BT03, a switching circuit BT04, a switching circuit BT05, a voltage transformation control circuit BT06, a voltage transformer circuit BT07, and a battery portion BT08 including a plurality of battery cells BT09 connected in series.

In the power storage device BT00 illustrated in FIG. 14, a portion including the terminal pair BT01, the terminal pair BT02, the switching control circuit BT03, the switching circuit BT04, the switching circuit BT05, the voltage transformation control circuit BT06, and the voltage transformer circuit BT07 can be referred to as a battery management unit.

The switching control circuit BT03 controls operations of the switching circuits BT04 and BT05. Specifically, the switching control circuit BT03 selects battery cells to be discharged (a discharge battery cell group) and battery cells to be charged (a charge battery cell group) in accordance with voltage measured for every battery cell BT09.

Furthermore, the switching control circuit BT03 outputs a control signal S1 and a control signal S2 on the basis of the selected discharge battery cell group and the selected charge battery cell group. The control signal S1 is output to the switching circuit BT04. The control signal S1 controls the switching circuit BT04 so that the terminal pair BT01 and the discharge battery cell group are connected. In addition, the control signal S2 is output to the switching circuit BT05. The control signal S2 controls the switching circuit BT05 so that the terminal pair BT02 and the charge battery cell group are connected.

The switching control circuit BT03 generates the control signal S1 and the control signal S2 on the basis of the connection relation of the switching circuit BT04, the switching circuit BT05, and the voltage transformer circuit BT07 so that terminals having the same polarity of the terminal pair BT01 and the discharge battery cell group are connected with each other, or terminals having the same polarity of the terminal pair BT02 and the charge battery cell group are connected with each other.

The operations of the switching control circuit BT03 will be described in detail.

First, the switching control circuit BT03 measures the voltage of each of the plurality of battery cells BT09. Then, the switching control circuit BT03 determines that the battery cell BT09 having a voltage higher than a predetermined threshold value is a high-voltage battery cell (high-voltage cell) and that the battery cell BT09 having a voltage lower than the predetermined threshold value is a low-voltage battery cell (low-voltage cell), for example.

As a method to determine whether a battery cell is a high-voltage cell or a low-voltage cell, any of various methods can be employed. For example, the switching control circuit BT03 may determine whether each battery cell BT09 is a high-voltage cell or a low-voltage cell on the basis of the voltage of the battery cell BT09 having the highest voltage or the lowest voltage among the plurality of battery cells BT09. In this case, the switching control circuit BT03 can determine whether each battery cell BT09 is a high-voltage cell or a low-voltage cell by, for example, determining whether or not the ratio of the voltage of each battery cell BT09 to the reference voltage is the predetermined value or more. Then, the switching control circuit BT03 determines a charge battery cell group and a discharge battery cell group on the basis of the determination result.

Note that high-voltage cells and low-voltage cells are mixed in various states in the plurality of battery cells BT09. For example, the switching control circuit BT03 selects a portion having the largest number of high-voltage cells connected in series as the discharge battery cell group of mixed high-voltage cells and low-voltage cells. Furthermore, the switching control circuit BT03 selects a portion having the largest number of low-voltage cells connected in series as the charge battery cell group. In addition, the switching control circuit BT03 may preferentially select the battery cells BT09 which are almost overcharged or over-discharged as the discharge battery cell group or the charge battery cell group.

Figure 15A:
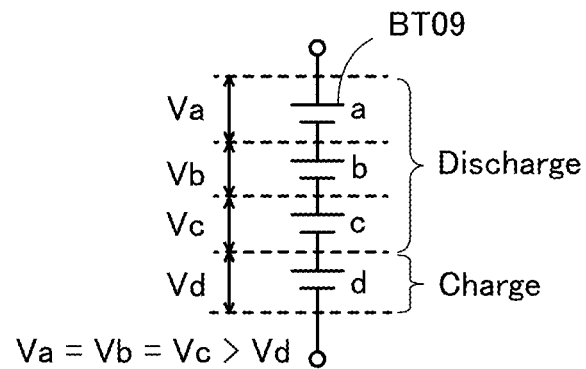
FIGS. 15A to 15C are schematic views each illustrating one embodiment of the present invention.
Figure 15B:
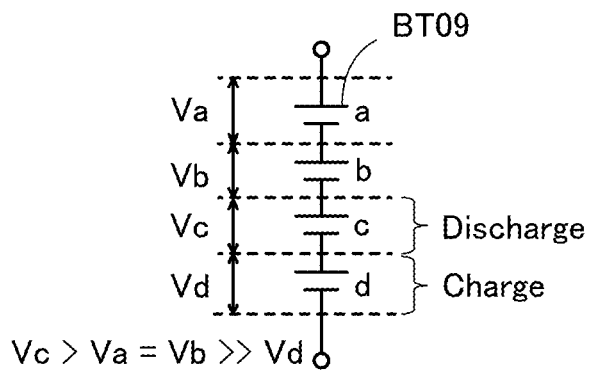
Figure 15C:
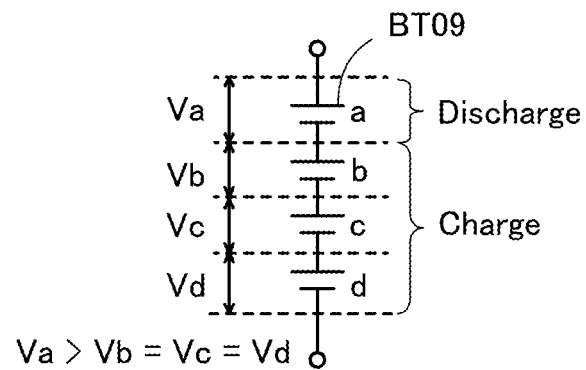

Here, operation examples of the switching control circuit BT03 in this embodiment will be described with reference to FIGS. 15A to 15C. FIGS. 15A to 15C illustrate the operation examples of the switching control circuit BT03. Note that FIGS. 15A to 15C each illustrate the case where four battery cells BT09 are connected in series as an example for convenience of explanation.

FIG. 15A shows the case where the relation of voltages Va, Vb, Vc, and Vd is Va=Vb=Vc>Vd where the voltages Va, Vb, Vc, and Vd are the voltages of a battery cell a, a battery cell b, a battery cell c, and a battery cell d, respectively. That is, a series of three high-voltage cells a to c and one low-voltage cell d are connected in series. In this case, the switching control circuit BT03 selects the series of three high-voltage cells a to c as the discharge battery cell group. In addition, the switching control circuit BT03 selects the low-voltage cell d as the charge battery cell group.

Next, FIG. 15B shows the case where the relation of the voltages is Vc>Va=Vb>>Vd. That is, a series of two low-voltage cells a and b, one high-voltage cell c, and one low-voltage cell d which is almost over-discharged are connected in series. In this case, the switching control circuit BT03 selects the high-voltage cell c as the discharge battery cell group. Since the low-voltage cell d is almost over-discharged, the switching control circuit BT03 preferentially selects the low-voltage cell d as the charge battery cell group instead of the series of two low-voltage cells a and b.

Lastly, FIG. 15C shows the case where the relation of the voltages is Va>Vb=Vc=Vd. That is, one high-voltage cell a and a series of three low-voltage cells b to d are connected in series. In this case, the switching control circuit BT03 selects the high-voltage cell a as the discharge battery cell group. In addition, the switching control circuit BT03 selects the series of three low-voltage cells b to d as the charge battery cell group.

On the basis of the determination result shown in the examples of FIGS. 15A to 15C, the switching control circuit BT03 outputs the control signal S1 and the control signal S2 to the switching circuit BT04 and the switching circuit BT05, respectively. Information showing the discharge battery cell group, which is the connection destination of the switching circuit BT04, is set in the control signal S1. Information showing the charge battery cell group, which is the connection destination of the switching circuit BT05 is set in the control signal S2.

The above is the detailed description of the operations of the switching control circuit BT03.

The switching circuit BT04 sets the connection destination of the terminal pair BT01 at the discharge battery cell group selected by the switching control circuit BT03, in response to the control signal S1 output from the switching control circuit BT03.

The terminal pair BT01 includes a pair of terminals A1 and A2. The switching circuit BT04 connects one of the pair of terminals A1 and A2 to a positive electrode terminal of the battery cell BT09 positioned on the most upstream side (on the high potential side) of the discharge battery cell group, and the other to a negative electrode terminal of the battery cell BT09 positioned on the most downstream side (on the low potential side) of the discharge battery cell group. Note that the switching circuit BT04 can recognize the position of the discharge battery cell group on the basis of the information set in the control signal S1.

The switching circuit BT05 sets the connection destination of the terminal pair BT02 at the charge battery cell group selected by the switching control circuit BT03, in response to the control signal S2 output from the switching control circuit BT03.

The terminal pair BT02 includes a pair of terminals B1 and B2. The switching circuit BT05 sets the connection destination of the terminal pair BT02 by connecting one of the pair of terminals B1 and B2 to a positive electrode terminal of the battery cell BT09 positioned on the most upstream side (on the high potential side) of the charge battery cell group, and the other to a negative electrode terminal of the battery cell BT09 positioned on the most downstream side (on the low potential side) of the charge battery cell group. Note that the switching circuit BT05 can recognize the position of the charge battery cell group on the basis of the information set in the control signal S2.

Figure 16:
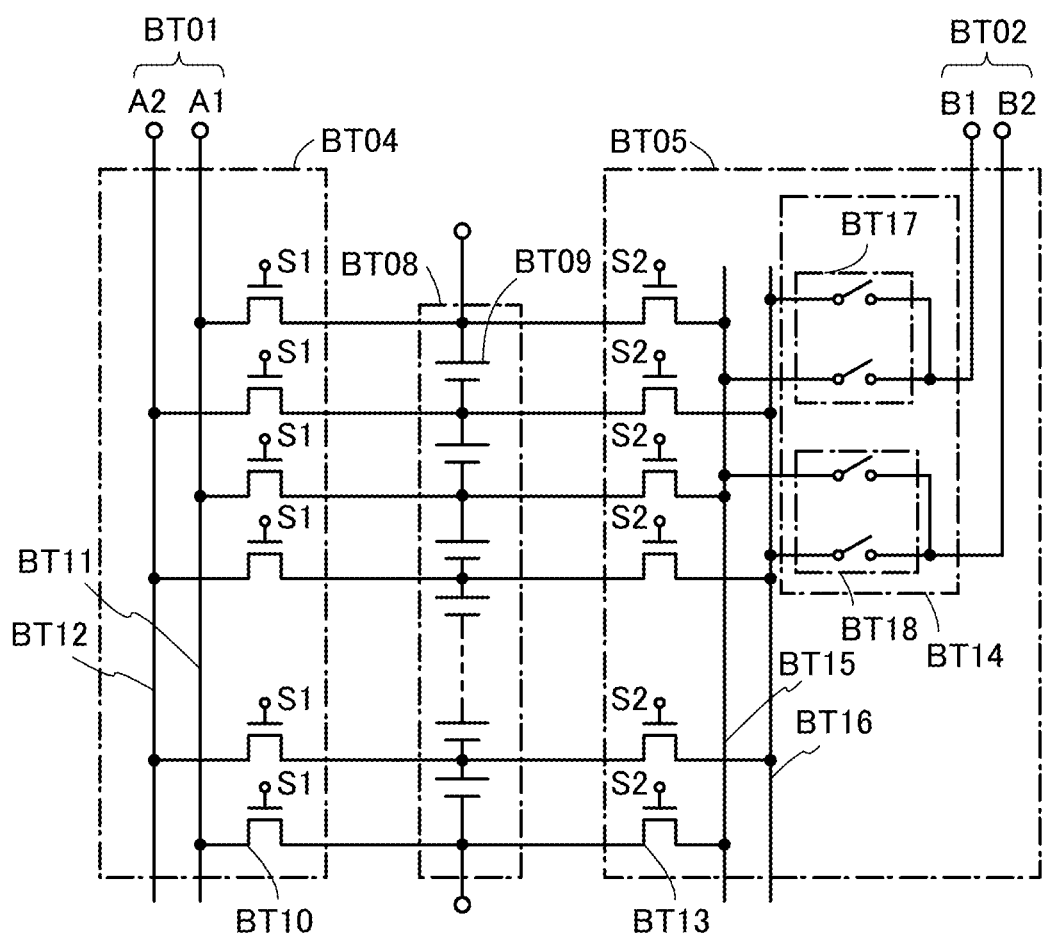
FIG. 16 is a circuit diagram illustrating one embodiment of the present invention.
Figure 17:
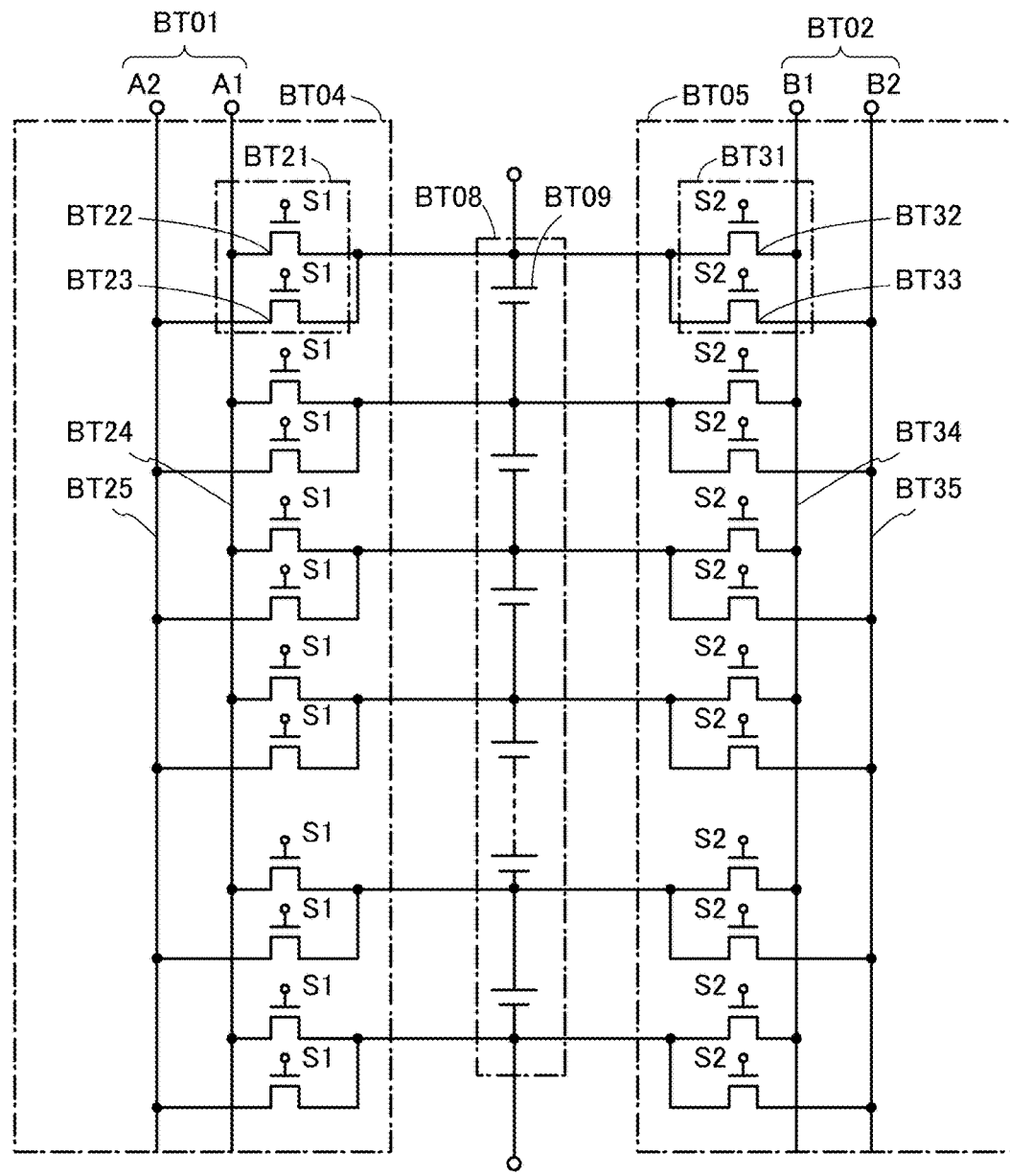
FIG. 17 is a circuit diagram illustrating one embodiment of the present invention.

FIG. 16 and FIG. 17 are circuit diagrams showing configuration examples of the switching circuits BT04 and BT05.

In FIG. 16, the switching circuit BT04 includes a plurality of transistors BT10, a bus BT11, and a bus BT12. The bus BT11 is connected to the terminal A1. The bus BT12 is connected to the terminal A2. Sources or drains of the plurality of transistors BT10 are connected alternately to the bus BT11 and the bus BT12. The sources or drains which are not connected to the bus BT11 and the bus BT12 of the plurality of transistors BT10 are each connected between two adjacent battery cells BT09.

The source or drain of the transistor BT10 which is not connected to the bus BT12 on the most upstream side of the plurality of transistors BT10 is connected to the positive electrode terminal of the battery cell BT09 on the most upstream side of the battery portion BT08. The source or drain of the transistor BT10 which is not connected to the bus BT12 of the transistor BT10 on the most downstream side of the plurality of transistors BT10 is connected to the negative electrode terminal of the battery cell BT09 on the most downstream side of the battery portion BT08.

The switching circuit BT04 connects the discharge battery cell group to the terminal pair BT01 by bringing one of the plurality of transistors BT10 which are connected to the bus BT11 and one of the plurality of transistors BT10 which are connected to the bus BT12 into an on state in response to the control signal S1 supplied to gates of the plurality of transistors BT10. Accordingly, the positive electrode terminal of the battery cell BT09 on the most upstream side of the discharge battery cell group is connected to one of the pair of terminals A1 and A2. In addition, the negative electrode terminal of the battery cell BT09 on the most downstream side of the discharge battery cell group is connected to the other of the pair of terminals A1 and A2 (i.e., a terminal which is not connected to the positive electrode terminal).

An OS transistor is preferably used as the transistor BT10. Since the off-state current of the OS transistor is low, the amount of charge that leaks from the battery cell which does not belong to the discharge battery cell group can be reduced, and reduction in capacity with the lapse of time can be suppressed. In addition, dielectric breakdown is unlikely to occur in the OS transistor when a high voltage is applied. Therefore, the battery cell BT09 and the terminal pair BT01, which are connected to the transistor BT10 in an off state, can be insulated from each other even when the output voltage of the discharge battery cell group is high.

In FIG. 16, the switching circuit BT05 includes a plurality of transistors BT13, a current control switch BT14, a bus BT15, and a bus BT16. The bus BT15 and the bus BT16 are provided between the plurality of transistors BT13 and the current control switch BT14. Sources or drains of the plurality of transistors BT13 are connected alternately to the bus BT15 and the bus BT16. The sources or drains which are not connected to the bus BT15 and the bus BT16 of the plurality of transistors BT13 are each connected between two adjacent battery cells BT09.

The source or drain of the transistor BT13 which is not connected to the bus BT16 on the most upstream side of the plurality of transistors BT13 is connected to the positive electrode terminal of the battery cell BT09 on the most upstream side of the battery portion BT08. The source or a drain of the transistor BT13 which is not connected to the bus BT16 on the most downstream side of the plurality of transistors BT13 is connected to the negative electrode terminal of the battery cell BT09 on the most downstream side of the battery portion BT08.

An OS transistor is preferably used as the transistors BT13 like the transistors BT10. Since the off-state current of the OS transistor is low, the amount of charge that leaks from the battery cells which do not belong to the charge battery cell group can be reduced, and reduction in capacity with the lapse of time can be suppressed. In addition, dielectric breakdown is unlikely to occur in the OS transistor when a high voltage is applied. Therefore, the battery cell BT09 and the terminal pair BT02, which are connected to the transistor BT13 in an off state, can be insulated from each other even when a voltage for charging the charge battery cell group is high.

The current control switch BT14 includes a switch pair BT17 and a switch pair BT18. Terminals on one end of the switch pair BT17 are connected to the terminal B1. Terminals on the other end of the switch pair BT17 branch off from two switches. One switch is connected to the bus BT15, and the other switch is connected to the bus BT16. Terminals on one end of the switch pair BT18 are connected to the terminal B2. Terminals on the other end of the switch pair BT18 extend from two switches. One switch is connected to the bus BT15, and the other switch is connected to the bus BT16.

OS transistors are preferably used for the switches included in the switch pair BT17 and the switch pair BT18 like the transistors BT10 and BT13.

The switching circuit BT05 connects the charge battery cell group and the terminal pair BT02 by controlling the combination of on and off states of the transistors BT13 and the current control switch BT14 in response to the control signal S2.

For example, the switching circuit BT05 connects the charge battery cell group and the terminal pair BT02 in the following manner.

The switching circuit BT05 brings a transistor BT13 connected to the positive electrode terminal of the battery cell BT09 on the most upstream side of the charge battery cell group into an on state in response to the control signal S2 supplied to gates of the plurality of transistors BT13. In addition, the switching circuit BT05 brings a transistor BT13 connected to the negative electrode terminal of the battery cell BT09 on the most downstream side of the charge battery cell group into an on state in response to the control signal S2 supplied to the gates of the plurality of transistors BT13.

The polarities of voltages applied to the terminal pair BT02 can vary in accordance with the configurations of the voltage transformer circuit BT07 and the discharge battery cell group connected to the terminal pair BT01. In order to supply a current in the direction for charging the charge battery cell group, terminals with the same polarity of the terminal pair BT02 and the charge battery cell group are required to be connected to each other. In view of this, the current control switch BT14 is controlled by the control signal S2 so that the connection destination of the switch pair BT17 and that of the switch pair BT18 are changed in accordance with the polarities of the voltages applied to the terminal pair BT02.

The state where voltages are applied to the terminal pair BT02 so as to make the terminal B1 a positive electrode and the terminal B2 a negative electrode will be described as an example. Here, in the case where the battery cell BT09 positioned on the most downstream side of the battery portion BT08 is in the charge battery cell group, the switch pair BT17 is controlled to be connected to the positive electrode terminal of the battery cell BT09 in response to the control signal S2. That is, the switch of the switch pair BT17 connected to the bus BT16 is turned on, and the switch of the switch pair BT17 connected to the bus BT15 is turned off. In contrast, the switch pair BT18 is controlled to be connected to the negative electrode terminal of the battery cell BT09 positioned on the most downstream side of the battery portion BT08 in response to the control signal S2. That is, the switch of the switch pair BT18 connected to the bus BT15 is turned on, and the switch of the switch pair BT18 connected to the bus BT16 is turned off. In this manner, terminals with the same polarity of the terminal pair BT02 and the charge battery cell group are connected to each other. In addition, the current which flows from the terminal pair BT02 is controlled to be supplied in a direction so as to charge the charge battery cell group.

In addition, instead of the switching circuit BT05, the switching circuit BT04 may include the current control switch BT14. In that case, the polarities of the voltages applied to the terminal pair BT02 are controlled by controlling the polarities of the voltages applied to the terminal pair BT01 in response to the operation of the current control switch BT14 and the control signal S1. Thus, the current control switch BT14 controls the direction of current which flows to the charge battery cell group from the terminal pair BT02.

FIG. 17 is a circuit diagram illustrating configuration examples of the switching circuit BT04 and the switching circuit BT05 which are different from those of FIG. 16.

In FIG. 17, the switching circuit BT04 includes a plurality of transistor pairs BT21, a bus BT24, and a bus BT25. The bus BT24 is connected to the terminal A1. The bus BT25 is connected to the terminal A2. Terminals on one end of each of the plurality of transistor pairs BT21 branch off from a transistor BT22 and a transistor BT23. Sources or drains of the transistors BT22 are connected to the bus BT24. Sources or drains of the transistors BT23 are connected to the bus BT25. In addition, terminals on the other end of each of the plurality of transistor pairs are connected between two adjacent battery cells BT09. The terminals on the other end of the transistor pair BT21 on the most upstream side of the plurality of transistor pairs BT21 are connected to the positive electrode terminal of the battery cell BT09 on the most upstream side of the battery portion BT08. The terminals on the other end of the transistor pair BT21 on the most downstream side of the plurality of transistor pairs BT21 are connected to a negative electrode terminal of the battery cell BT09 on the most downstream side of the battery portion BT08.

The switching circuit BT04 switches the connection destination of the transistor pair BT21 to one of the terminal A1 and the terminal A2 by turning on or off the transistors BT22 and BT23 in response to the control signal S1. Specifically, when the transistor BT22 is turned on, the transistor BT23 is turned off, so that the connection destination of the transistor pair BT21 is the terminal A1. On the other hand, when the transistor BT23 is turned on, the transistor BT22 is turned off, so that the connection destination of the transistor pair BT21 is the terminal A2. Which of the transistors BT22 and BT23 is turned on is determined by the control signal S1.

Two transistor pairs BT21 are used to connect the terminal pair BT01 and the discharge battery cell group. Specifically, the connection destinations of the two transistor pairs BT21 are determined on the basis of the control signal S1, and the discharge battery cell group and the terminal pair BT01 are connected. The connection destinations of the two transistor pairs BT21 are controlled by the control signal S1 so that one of the connection destinations is the terminal A1 and the other is the terminal A2.

The switching circuit BT05 includes a plurality of transistor pairs BT31, a bus BT34, and a bus BT35. The bus BT34 is connected to the terminal B1. The bus BT35 is connected to the terminal B2. Terminals on one end of each of the plurality of transistor pairs BT31 branch off from a transistor BT32 and a transistor BT33. One terminal extending from the transistor BT32 is connected to the bus BT34. The other terminal extending from the transistor BT33 is connected to the bus BT35. Terminals on the other end of each of the plurality of transistor pairs BT31 are connected between two adjacent battery cells BT09. The terminal on the other end of the transistor pair BT31 on the most upstream side of the plurality of transistor pairs BT31 is connected to the positive electrode terminal of the battery cell BT09 on the most upstream side of the battery portion BT08. The terminal on the other end of the transistor pair BT31 on the most downstream side of the plurality of transistor pairs BT31 is connected to the negative electrode terminal of the battery cell BT09 on the most downstream side of the battery portion BT08.

The switching circuit BT05 switches the connection destination of the transistor pair BT31 to one of the terminal B1 and the terminal B2 by turning on or off the transistors BT32 and BT33 in response to the control signal S2. Specifically, when the transistor BT32 is turned on, the transistor BT33 is turned off, so that the connection destination of the transistor pair BT31 is the terminal B1. On the other hand, when the transistor BT33 is turned on, the transistor BT32 is turned off, so that the connection destination of the transistor pair BT31 is the terminal B2. Which of the transistors BT32 and BT33 is turned on is determined by the control signal S2.

Two transistor pairs BT31 are used to connect the terminal pair BT02 and the charge battery cell group. Specifically, the connection destinations of the two transistor pairs BT31 are determined on the basis of the control signal S2, and the charge battery cell group and the terminal pair BT02 are connected. The connection destinations of the two transistor pairs BT31 are controlled by the control signal S2 so that one of the connection destinations is the terminal B1 and the other is the terminal B2.

The connection destinations of the two transistor pairs BT31 are determined by the polarities of the voltages applied to the terminal pair BT02. Specifically, in the case where voltages which make the terminal B1 a positive electrode and the terminal B2 a negative electrode are applied to the terminal pair BT02, the transistor pair BT31 on the upstream side is controlled by the control signal S2 so that the transistor BT32 is turned on and the transistor BT33 is turned off. In contrast, the transistor pair BT31 on the downstream side is controlled by the control signal S2 so that the transistor BT33 is turned on and the transistor BT32 is turned off. In the case where voltages which make the terminal B1 a negative electrode and the terminal B2 a positive electrode are applied to the terminal pair BT02, the transistor pair BT31 on the upstream side is controlled by the control signal S2 so that the transistor BT33 is turned on and the transistor BT32 is turned off. In contrast, the transistor pair BT31 on the downstream side is controlled by the control signal S2 so that the transistor BT32 is turned on and the transistor BT33 is turned off. In this manner, terminals with the same polarity of the terminal pair BT02 and the charge battery cell group are connected to each other. In addition, the current which flows from the terminal pair BT02 is controlled to be supplied in the direction for charging the charge battery cell group.

The voltage transformation control circuit BT06 controls the operation of the voltage transformer circuit BT07. The voltage transformation control circuit BT06 generates a voltage transformation signal S3 for controlling the operation of the voltage transformer circuit BT07 on the basis of the number of the battery cells BT09 included in the discharge battery cell group and the number of the battery cells BT09 included in the charge battery cell group and outputs the voltage transformation signal S3 to the voltage transformer circuit BT07.

In the case where the number of the battery cells BT09 included in the discharge battery cell group is larger than that included in the charge battery cell group, it is necessary to prevent a charging voltage which is too high from being applied to the charge battery cell group. Thus, the voltage transformation control circuit BT06 outputs the voltage transformation signal S3 for controlling the voltage transformer circuit BT07 so that a discharging voltage (Vdis) is lowered within a range where the charge battery cell group can be charged.

In the case where the number of the battery cells BT09 included in the discharge battery cell group is less than or equal to that included in the charge battery cell group, a charging voltage necessary for charging the charge battery cell group needs to be ensured. Therefore, the voltage transformation control circuit BT06 outputs the voltage transformation signal S3 for controlling the voltage transformer circuit BT07 so that the discharging voltage (Vdis) is raised within a range where a charging voltage which is too high is not applied to the charge battery cell group.

The voltage value of the charging voltage which is too high is determined in the light of product specifications and the like of the battery cell BT09 used in the battery portion BT08. The voltage which is raised or lowered by the voltage transformer circuit BT07 is applied as a charging voltage (Vcha) to the terminal pair BT02.

Figure 18A:
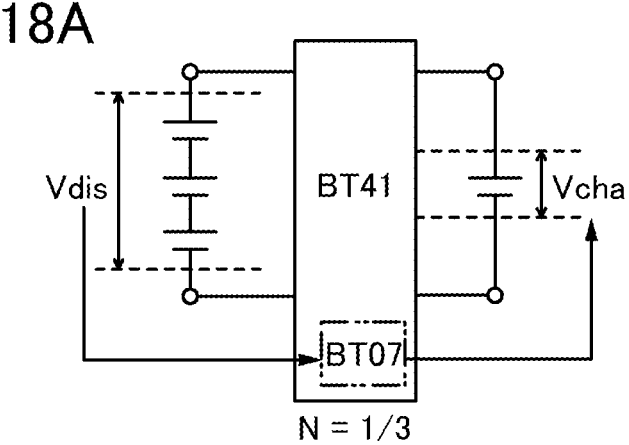
FIGS. 18A to 18C are schematic views each illustrating one embodiment of the present invention.
Figure 18B:
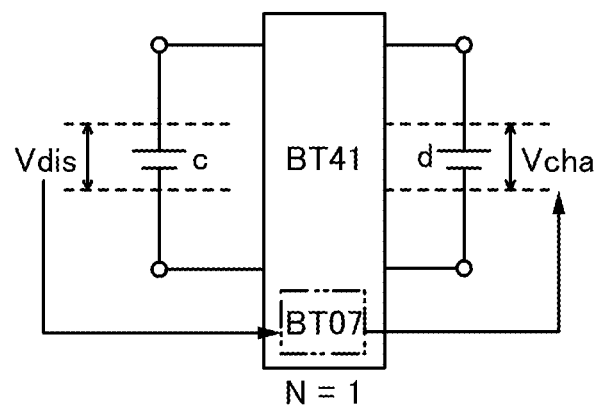
Figure 18C:
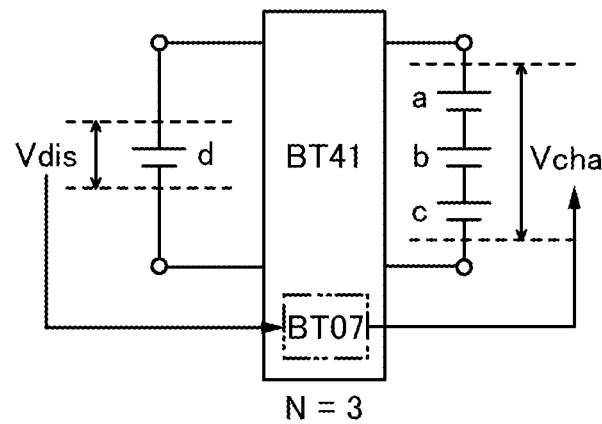

Here, operation examples of the voltage transformation control circuit BT06 in this embodiment will be described with reference to FIGS. 18A to 18C. FIGS. 18A to 18C are conceptual diagrams for explaining the operation examples of the voltage transformation control circuit BT06 corresponding to the discharge battery cell group and the charge battery cell group described in FIGS. 15A to 15C. FIGS. 18A to 18C each illustrate a battery control unit BT41. The battery control unit BT41 includes the terminal pair BT01, the terminal pair BT02, the switching control circuit BT03, the switching circuit BT04, the switching circuit BT05, the voltage transformation control circuit BT06, and the voltage transformer circuit BT07.

In an example illustrated in FIG. 18A, the series of three high-voltage cells a to c and one low-voltage cell d are connected in series as described in FIG. 15A. In this case, as described using FIG. 15A, the switching control circuit BT03 determines the high-voltage cells a to c as the discharge battery cell group, and determines the low-voltage cell d as the charge battery cell group. The voltage transformation control circuit BT06 calculates a conversion ratio N for converting the discharging voltage (Vdis) into the charging voltage (Vcha) based on the ratio of the number of the battery cells BT09 included in the charge battery cell group to the number of the battery cells BT09 included in the discharge battery cell group.

In the case where the number of the battery cells BT09 included in the discharge battery cell group is larger than that included in the charge battery cell group, when a discharging voltage is applied to the terminal pair BT02 without transforming the voltage, an overvoltage may be applied to the battery cells BT09 included in the charge battery cell group through the terminal pair BT02. Thus, in the case of FIG. 18A, it is necessary that a charging voltage (Vcha) applied to the terminal pair BT02 be lower than the discharging voltage. In addition, in order to charge the charge battery cell group, it is necessary that the charging voltage be higher than the total voltage of the battery cells BT09 included in the charge battery cell group. Thus, the voltage transformation control circuit BT06 sets the conversion ratio N for raising or lowering voltage larger than the ratio of the number of the battery cells BT09 included in the charge battery cell group to the number of the battery cells BT09 included in the discharge battery cell group.

Thus, the voltage transformation control circuit BT06 preferably sets the conversion ratio N for raising or lowering voltage larger than the ratio of the number of the battery cells BT09 included in the charge battery cell group to the number of the battery cells BT09 included in the discharge battery cell group by about 1% to 10%. Here, the charging voltage is made higher than the voltage of the charge battery cell group, but the charging voltage is equal to the voltage of the charge battery cell group in reality. Note that the voltage transformation control circuit BT06 feeds a current for charging the charge battery cell group in accordance with the conversion ratio N for raising or lowering voltage in order to make the voltage of the charge battery cell group equal to the charging voltage. The value of the current is set by the voltage transformation control circuit BT06.

In the example illustrated in FIG. 18A, since the number of the battery cells BT09 included in the discharge battery cell group is three and the number of the battery cells BT09 included in the charge battery cell group is one, the voltage transformation control circuit BT06 calculates a value which is slightly larger than ⅓ as the conversion ratio N for raising or lowering voltage. Then, the voltage transformation control circuit BT06 outputs the voltage transformation signal S3, which lowers the discharging voltage in accordance with the conversion ratio N for raising or lowering voltage and converts the voltage into a charging voltage, to the voltage transformer circuit BT07. The voltage transformer circuit BT07 applies the charging voltage which is obtained by transformation in response to the voltage transformation signal S3 to the terminal pair BT02. Then, the battery cells BT09 included in the charge battery cell group are charged with the charging voltage applied to the terminal pair BT02.

In each of examples illustrated in FIGS. 18B and 18C, the conversion ratio N for raising or lowering voltage is calculated in a manner similar to that of FIG. 18A. In each of the examples illustrated in FIGS. 18B and 18C, since the number of the battery cells BT09 included in the discharge battery cell group is less than or equal to the number of the battery cells BT09 included in the charge battery cell group, the conversion ratio N for raising or lowering voltage is 1 or more. Therefore, in this case, the voltage transformation control circuit BT06 outputs the voltage transformation signal S3 for raising the discharging voltage and converting the voltage into the charging voltage.

The voltage transformer circuit BT07 converts the discharging voltage applied to the terminal pair BT01 into a charging voltage in response to the voltage transformation signal S3. The voltage transformer circuit BT07 applies the charging voltage to the terminal pair BT02. Here, the voltage transformer circuit BT07 electrically insulates the terminal pair BT01 from the terminal pair BT02. Accordingly, the voltage transformer circuit BT07 prevents a short circuit due to a difference between the absolute voltage of the negative electrode terminal of the battery cell BT09 on the most downstream side of the discharge battery cell group and the absolute voltage of the negative electrode terminal of the battery cell BT09 on the most downstream side of the charge battery cell group. Furthermore, the voltage transformer circuit BT07 converts the discharging voltage, which is the total voltage of the discharge battery cell group, into the charging voltage in response to the voltage transformation signal S3 as described above.

An insulated direct current (DC)-DC converter or the like can be used in the voltage transformer circuit BT07. In that case, the voltage transformation control circuit BT06 controls the charging voltage converted by the voltage transformer circuit BT07 by outputting a signal for controlling the on/off ratio (the duty ratio) of the insulated DC-DC converter as the voltage transformation signal S3.

Examples of the insulated DC-DC converter include a flyback converter, a forward converter, a ringing choke converter (RCC), a push-pull converter, a half-bridge converter, and a full-bridge converter, and a suitable converter is selected in accordance with the value of the intended output voltage.

Figure 19:
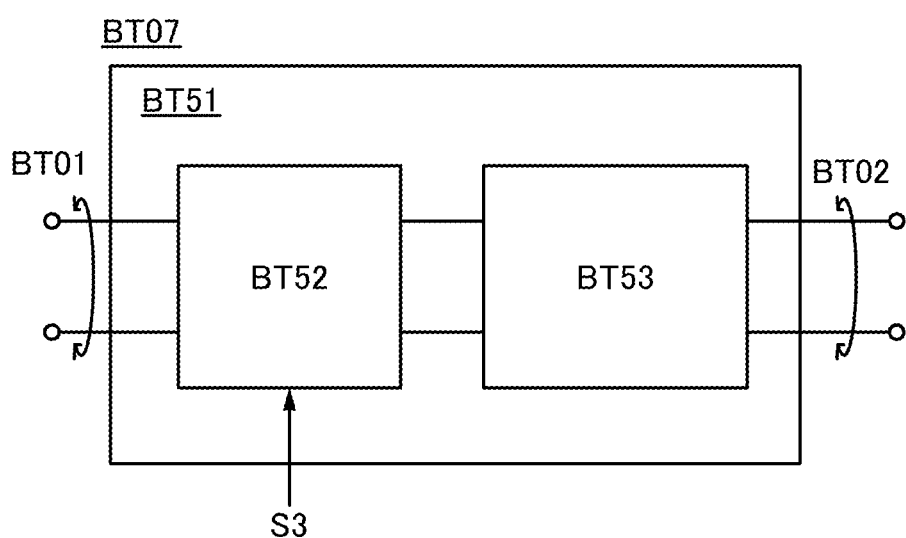
FIG. 19 is a block diagram illustrating one embodiment of the present invention.

The configuration of the voltage transformer circuit BT07 including the insulated DC-DC converter is illustrated in FIG. 19. An insulated DC-DC converter BT51 includes a switch portion BT52 and a transformer BT53. The switch portion BT52 is a switch for switching on/off of the insulated DC-DC converter, and a metal oxide semiconductor field-effect transistor (MOSFET), a bipolar transistor, or the like is used as the switch portion BT52. The switch portion BT52 periodically turns on and off the insulated DC-DC converter BT51 in response to the voltage transformation signal S3 for controlling the on/off ratio which is output from the voltage transformation control circuit BT06. The switch portion BT52 can have any of various structures in accordance with the type of the insulated DC-DC converter which is used. The transformer BT53 converts the discharging voltage applied from the terminal pair BT01 into the charging voltage. In detail, the transformer BT53 operates in conjunction with the on/off state of the switch portion BT52 and converts the discharging voltage into the charging voltage in accordance with the on/off ratio. As the time during which the switch portion BT52 is on becomes longer in its switching period, the charging voltage is increased. On the other hand, as the time during which the switch portion BT52 is on becomes shorter in its switching period, the charging voltage is decreased. In the case where the insulated DC-DC converter is used, the terminal pair BT01 and the terminal pair BT02 can be insulated from each other inside the transformer BT53.

Figure 20:
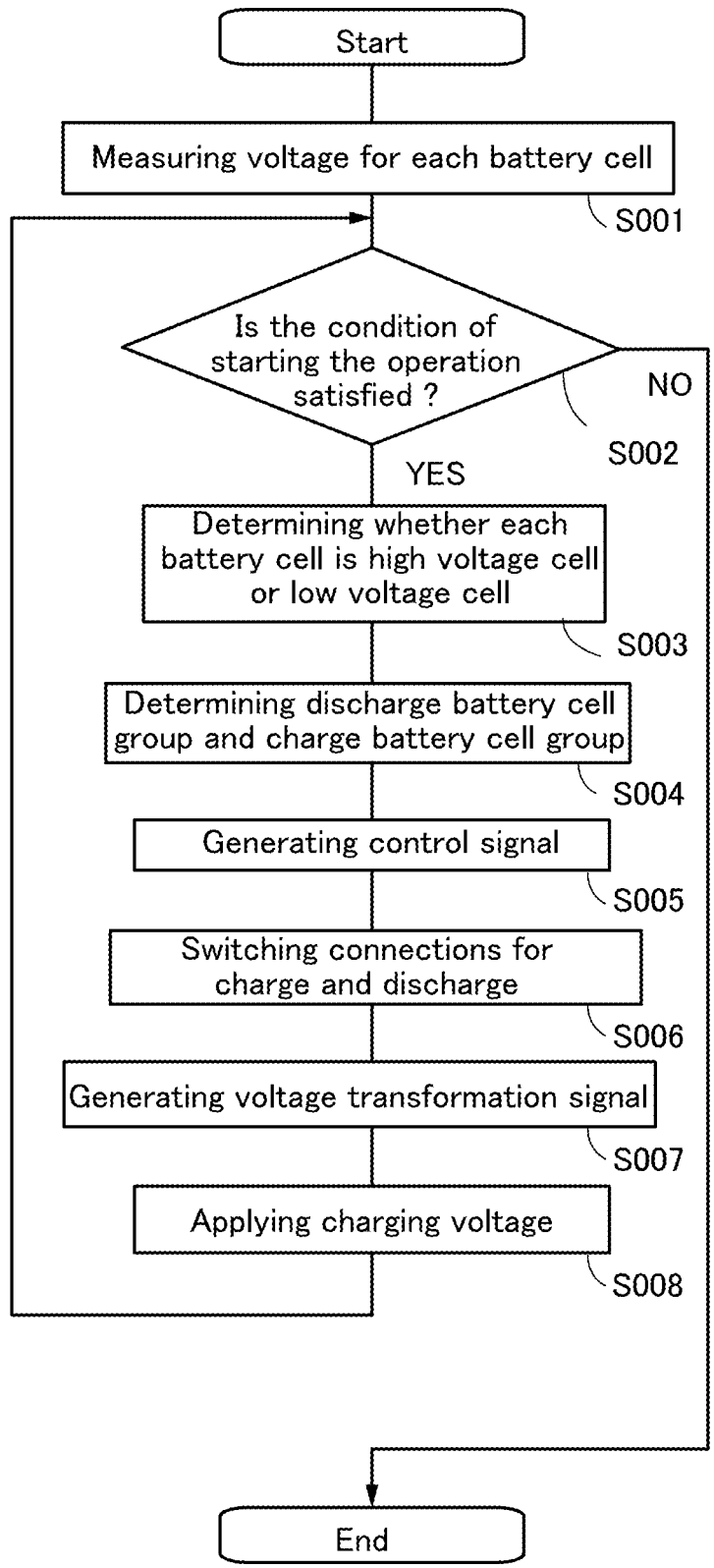
FIG. 20 is a flow chart showing one embodiment of the present invention.

A flow of operations of the power storage device BT00 in this embodiment will be described with reference to FIG. 20. FIG. 20 is a flow chart showing the flow of the operations of the power storage device BT00.

First, the power storage device BT00 obtains a voltage measured for each of the plurality of battery cells BT09 (step S001). Then, the power storage device BT00 determines whether or not the condition for starting the operation of reducing variations in voltage of the plurality of battery cells BT09 is satisfied (step S002). For example, the condition that the difference between the maximum value and the minimum value of the voltage measured for each of the plurality of battery cells BT09 is higher than or equal to the predetermined threshold value can be used. In the case where the condition is not satisfied (step S002: NO), the power storage device BT00 does not perform the following operation because voltages of the battery cells BT09 are well balanced. In contrast, in the case where the condition is satisfied (step S002: YES), the power storage device BT00 performs the operation of reducing variations in the voltage of the battery cells BT09. In this operation, the power storage device BT00 determines whether each battery cell BT09 is a high voltage cell or a low voltage cell on the basis of the measured voltage of each cell (step S003). Then, the power storage device BT00 determines a discharge battery cell group and a charge battery cell group on the basis of the determination result (step S004). In addition, the power storage device BT00 generates the control signal S1 for setting the connection destination of the terminal pair BT01 to the determined discharge battery cell group, and the control signal S2 for setting the connection destination of the terminal pair BT02 to the determined charge battery cell group (step S005). The power storage device BT00 outputs the generated control signals S1 and S2 to the switching circuit BT04 and the switching circuit BT05, respectively.

Then, the switching circuit BT04 connects the terminal pair BT01 and the discharge battery cell group, and the switching circuit BT05 connects the terminal pair BT02 and the discharge battery cell group (step S006). The power storage device BT00 generates the voltage transformation signal S3 based on the number of the battery cells BT09 included in the discharge battery cell group and the number of the battery cells BT09 included in the charge battery cell group (step S007). Then, the power storage device BT00 converts, in response to the voltage transformation signal S3, the discharging voltage applied to the terminal pair BT01 into a charging voltage and applies the charging voltage to the terminal pair BT02 (step S008). In this way, charge of the discharge battery cell group is transferred to the charge battery cell group.

Although the plurality of steps are shown in order in the flow chart of FIG. 20, the order of performing the steps is not limited to the order.

According to the above embodiment, when charge is transferred from the discharge battery cell group to the charge battery cell group, a structure where charge from the discharge battery cell group is temporarily stored, and the stored charge is sent to the charge battery cell group is unnecessary, unlike in the a capacitive type circuit. Accordingly, the charge transfer efficiency per unit time can be increased. In addition, the switching circuit BT04 and the switching circuit BT05 determine which battery cell in the discharge battery cell group and the charge battery cell group to be connected to the voltage transformer circuit.

Furthermore, the voltage transformer circuit BT07 converts the discharging voltage applied to the terminal pair BT01 into the charging voltage based on the number of the battery cells BT09 included in the discharge battery cell group and the number of the battery cells BT09 included in the charge battery cell group, and applies the charging voltage to the terminal pair BT02. Thus, charge can be transferred without any problems regardless of how the battery cells BT09 are selected as the discharge battery cell group and the charge battery cell group.

Furthermore, the use of OS transistors as the transistor BT10 and the transistor BT13 can reduce the amount of charge that leaks from the battery cells BT09 not belonging to the charge battery cell group or the discharge battery cell group. Accordingly, a decrease in capacity of the battery cells BT09 which do not contribute to charging or discharging can be suppressed. In addition, the variations in characteristics of the OS transistor due to heat are smaller than those of an Si transistor. Accordingly, even when the temperature of the battery cells BT09 is increased, an operation such as turning on or off the transistors in response to the control signals S1 and S2 can be performed normally.

This embodiment can be implemented in combination with any of the other embodiments as appropriate.

EXAMPLE 1

In this example, stress on current collectors was calculated using a finite element method.

As software for the calculation, ANSYS Mechanical APDL 14.0 was used. Calculation conditions are as follows: materials of the current collectors and lead electrodes are aluminum; the Young's modulus of aluminum is $7.03 \times 10^{10}$ Pa; the Poisson's ratio is 0.345; the element type is 187 (three-dimensional 10-node tetrahedral solid); and the number of elements is 20.

FIGS. 21A to 21D illustrate the current collectors and the lead electrodes that were used as calculation models. FIGS.

Figure 21A:
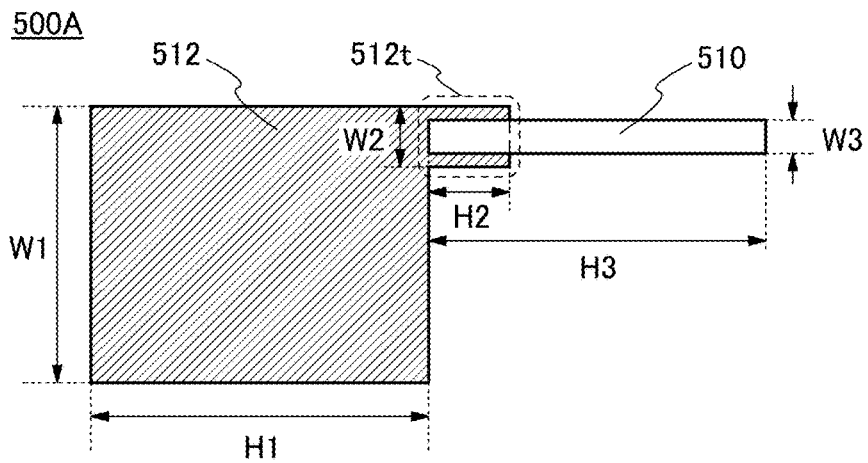
FIGS. 21A to 21D are top views and cross-sectional views illustrating calculation models of Example 1.
Figure 21B:
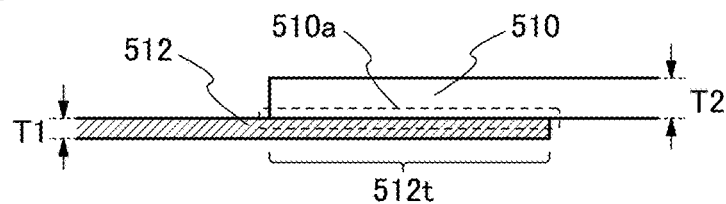
Figure 21C:
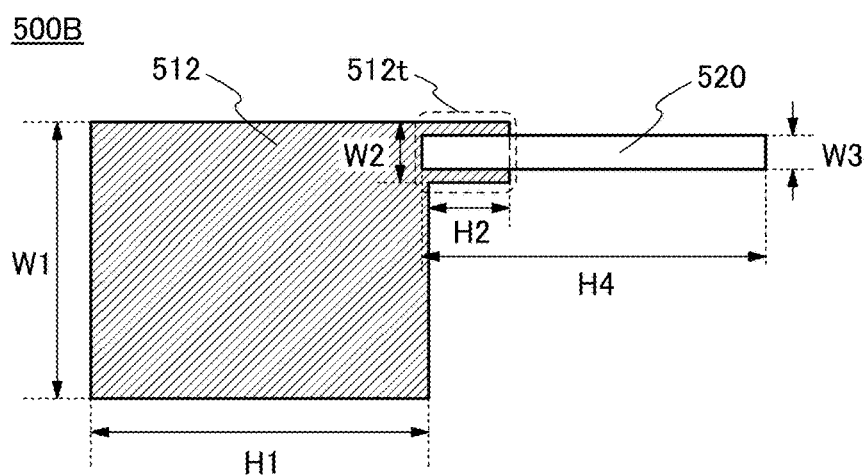
Figure 21D:
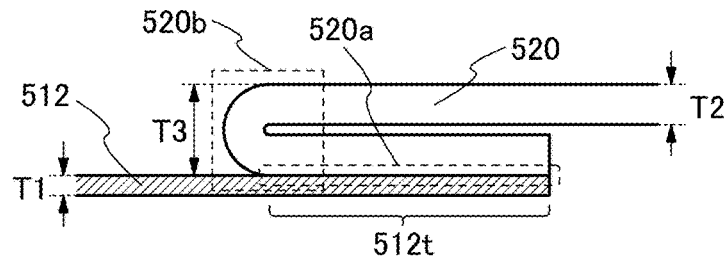

21A and 21B are a top view and a cross-sectional view of a model 500A where a lead electrode 510 without a fold portion is connected to a current collector 512. FIGS. 21C and 21D are a top view and a cross-sectional view of a model 500B where a lead electrode 520 with a fold portion 520b is connected to the current collector 512. Note that FIG. 21B is a cross-sectional view illustrating an area around a tab portion 512t in FIG. 21A, and FIG. 21D is a cross-sectional view illustrating an area around the tab portion 512t in FIG. 21C. Note that the tab portion 512t is included in the current collector 512, and a region of the current collector 512 except the tab portion 512t is called the main body of the current collector 512 in this example.

The dimensions of the calculation models are as follows. A width W1 of the current collector 512 is 41 mm. A length H1 of the current collector 512 except the tab portion 512t is 50 mm. A width W2 of the tab portion 512t is 9 mm. A length H2 of the tab portion 512t is 12 mm. A thickness T1 of the tab portion 512t is 0.2 mm. A width W3 and a thickness T2 of each of the lead electrode 510 and the lead electrode 520 are 5 mm and 0.4 mm, respectively. In the top view, a length H3 of the lead electrode 510 is 50 mm. A length H4 of the lead electrode 520 is 50.45 mm. The width and the length of each of a connection portion 510a and a connection portion 520a are equal to W3 and H2, respectively. The curvature radius of a surface of the fold portion 520b of the lead electrode 520 (on the side with a larger curvature radius) is 0.45 mm. That is, a height T3 of the lead electrode 520 from a surface of the current collector 512 is 0.9 mm.

Figure 22:
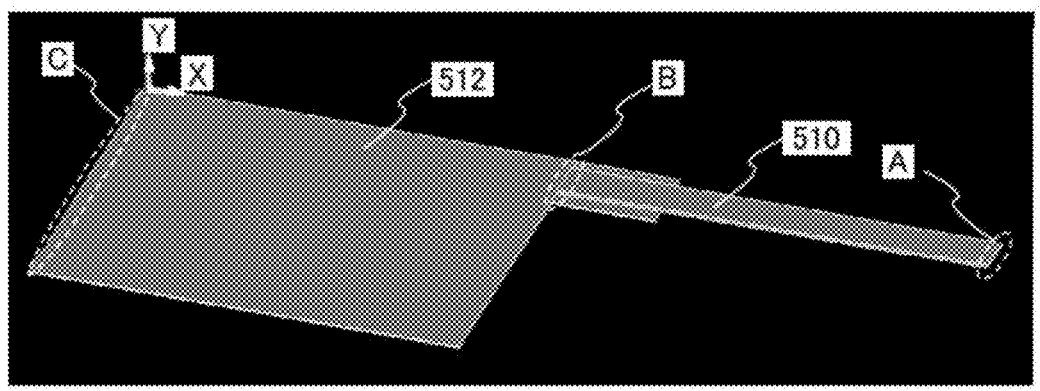
FIG. 22 is a perspective view of a calculation model of Example 1.

A load imposed to curve the models 500A and 500B will be described with reference to FIG. 22. FIG. 22 is a perspective view of the model 500A. In this example, a side surface (region A in FIG. 22) of an end of the lead electrode 510 (or lead electrode 520) was fixed, a boundary portion (region B in FIG. 22) between the main body of the current collector 512 and the tab portion 512t on the back surface side (the side opposite to a surface connected to the lead electrode) was fixed so as not to be displaced in the Y direction, and an end (region C in FIG. 22) of the current collector 512 on the side opposite to a side connected to the lead electrode was displaced −1 mm in the Y direction. Stress imposed on the whole model in this case was calculated.

Figure 23A:
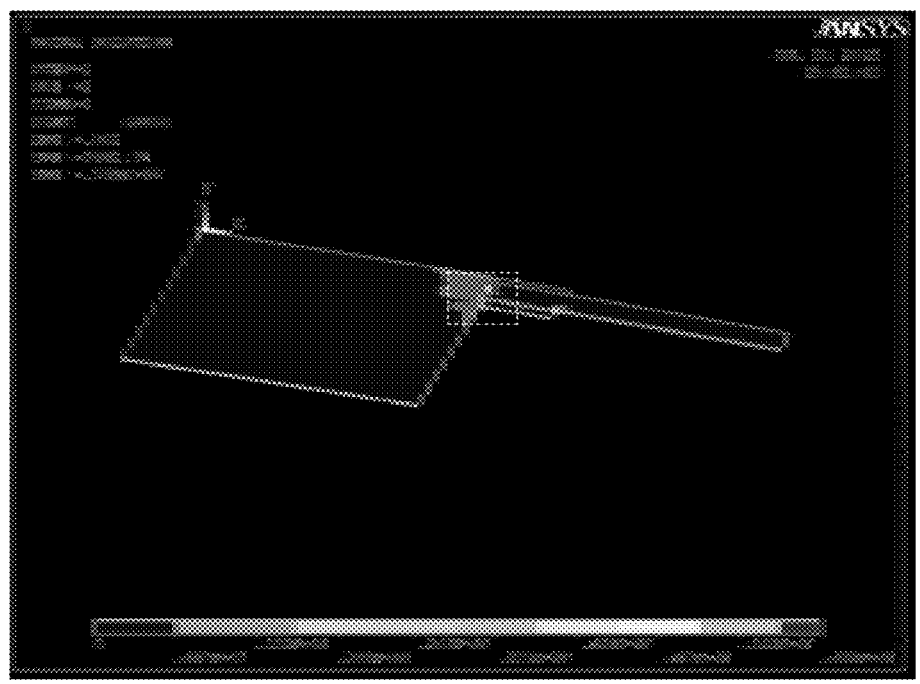
FIGS. 23A and 23B show a calculation result of stress distribution in Example 1.
Figure 23B:
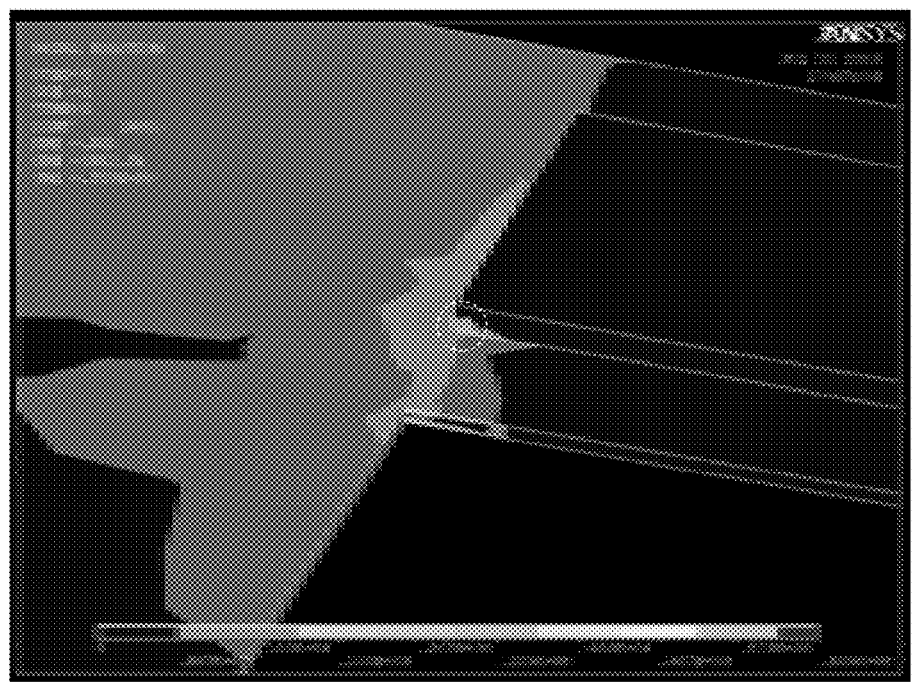
Figure 24A:
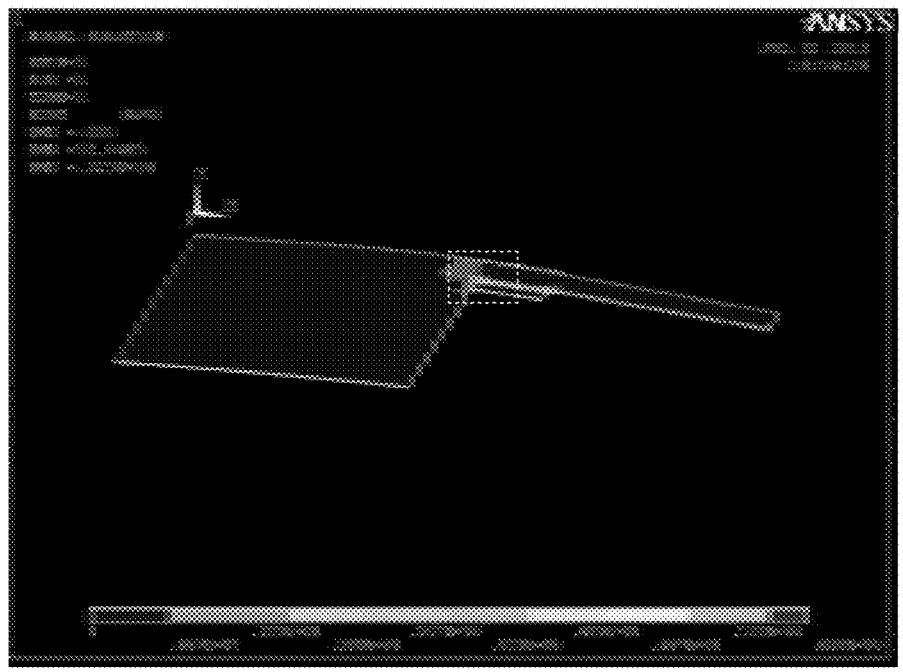
FIGS. 24A and 24B show a calculation result of stress distribution in Example 1.
Figure 24B:
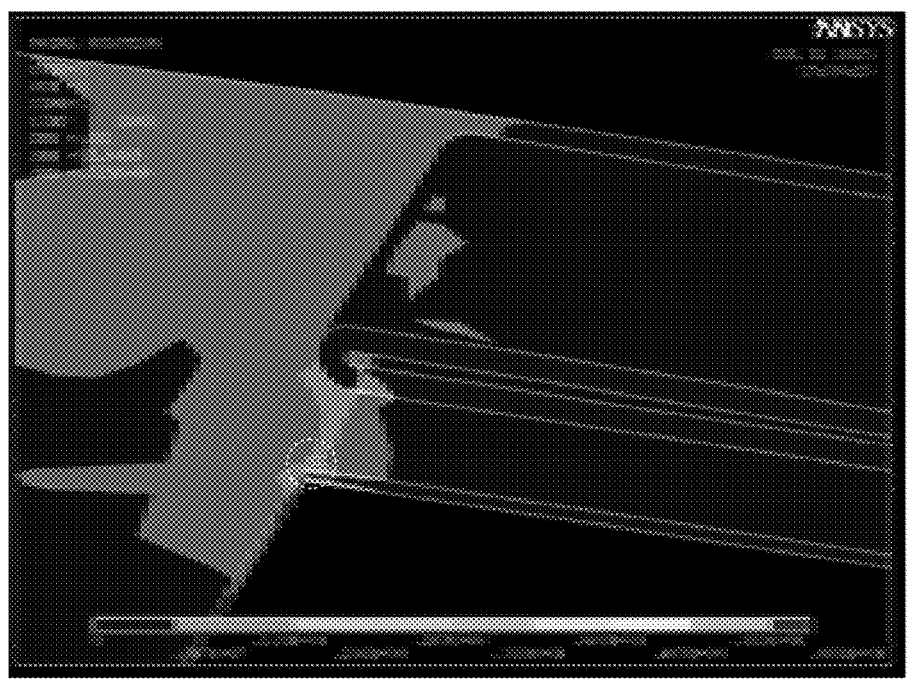

FIGS. 23A and 23B and FIGS. 24A and 24B show calculation results. FIG. 23A is a perspective view showing the distribution of stress on the whole model 500A without a fold portion, and FIG. 23B is an enlarged view showing a region surrounded by the dotted line in FIG. 23A. FIG. 24A is a perspective view showing the distribution of stress on the whole model 500B with a fold portion, and FIG. 24B is an enlarged view showing a region surrounded by the dotted line in FIG. 24A.

A portion of each of the models on which the greatest stress was imposed in the calculation is surrounded by a circle (see FIG. 23B and FIG. 24B). The highest stress in the model 500A is $5.59 \times 10^7$ Pa, and the highest stress in the model 500B is $3.25 \times 10^7$ Pa.

The results of this example indicate that the lead electrode having the fold portion relaxed stress imposed on the vicinity of the tab portion of the current collector when power storage unit was curved.

This application is based on Japanese Patent Application serial no. 2014-217576 filed with Japan Patent Office on Oct. 24, 2014, the entire contents of which are hereby incorporated by reference.

What is claimed is:

1. A flexible power storage unit comprising:
   a flexible external body;
   a positive electrode provided inside the flexible external body, the positive electrode including a positive electrode tab portion protruding in a first direction;
   a negative electrode provided inside the flexible external body, the negative electrode including a negative electrode tab portion protruding in the first direction;
   a first lead electrode provided on the positive electrode tab portion, the first lead electrode having:
      a first region over and in contact with the positive electrode tab portion;
      a first folded portion at which the first lead electrode is folded on the positive electrode tab portion; and
      a second region being adjacent to the first folded portion of the first lead electrode and provided over the first region of the first lead electrode; and
   a second lead electrode provided on the negative electrode tab portion, the second lead electrode having:
      a first region over and in contact with a first folded portion at which the second lead electrode is folded on the negative electrode tab portion; and
      a second region being adjacent to the first folded portion of the second lead electrode and provided over the first region of the second lead electrode,
   wherein the first folded portion, the first region, and a first part of the second region of the first lead electrode, the first folded portion, the first region, and a first part of the second region of the second lead electrode, the positive electrode tab portion, and the negative electrode tab portion are provided inside the flexible external body.

2. The flexible power storage unit according to claim 1, wherein an angle formed by a folding line of the first folded portion of the first lead electrode and a straight line parallel to the first direction is greater than or equal to 45° and less than or equal to 90°.

3. The flexible power storage unit according to claim 1, wherein an angle formed by a folding line of the first folded portion of the second lead electrode and a straight line parallel to the first direction is greater than or equal to 45° and less than or equal to 90°.

4. The flexible power storage unit according to claim 1, wherein a thickness of part of the flexible external body is greater than or equal to 20 μm and less than or equal to 150 μm.

5. The flexible power storage unit according to claim 1, wherein the flexible external body includes an embossed region.

6. The flexible power storage unit according to claim 1, wherein a plurality of positive electrodes and a plurality of negative electrodes are provided inside the flexible external body.

7. The flexible power storage unit according to claim 1,
   wherein the first region of the first lead electrode is welded to the positive electrode tab portion, and
   wherein the first region of the second lead electrode is welded to the negative electrode tab portion.

8. The flexible power storage unit according to claim 1, wherein a part of the second region of the first lead electrode and a part of the second region of the second lead electrode are protruding from a first end portion of the flexible external body in the first direction.

9. The flexible power storage unit according to claim 1, wherein each of the first lead electrode and the second lead electrode further has a second folded portion.

10. An electronic device comprising:
the flexible power storage unit according to claim 1; and
at least one of a display portion, an operation button, a speaker, and a microphone.

11. A flexible power storage unit comprising:
a flexible external body;
a positive electrode provided inside the flexible external body, the positive electrode including a positive electrode tab portion protruding in a first direction;
a negative electrode provided inside the flexible external body, the negative electrode including a negative electrode tab portion protruding in the first direction;
a first lead electrode provided on the positive electrode tab portion, the first lead electrode having:
    a first region provided over and in contact with the positive electrode tab portion;
    a deformation region including at least a first folding line and being adjacent to the first region of the first lead electrode on the positive electrode tab portion; and
    a second region being adjacent to the deformation region of the first lead electrode and provided over the first region of the first lead electrode; and
a second lead electrode provided on the negative electrode tab portion, the second lead electrode having:
    a first region over and in contact with the negative electrode tab portion;
    a deformation region including at least a first folding line and being adjacent to the first region of the second lead electrode on the negative electrode tab portion; and
    a second region being adjacent to the deformation region of the second lead electrode and provided over the second region of the first lead electrode,
wherein a first part of the second region of the first lead electrode overlaps with the positive electrode tab portion and the first region of the first lead electrode, and
wherein a first part of the second region of the second lead electrode overlaps with the negative electrode tab portion and the first region of the second lead electrode.

12. The flexible power storage unit according to claim 11, wherein an angle formed by the first folding line of the first lead electrode and a straight line parallel to the first direction is greater than or equal to 45° and less than or equal to 90°.

13. The flexible power storage unit according to claim 11, wherein an angle formed by the first folding line of the second lead electrode and a straight line parallel to the first direction is greater than or equal to 45° and less than or equal to 90°.

14. The flexible power storage unit according to claim 11, wherein a thickness of part of the flexible external body is greater than or equal to 20 μm and less than or equal to 150 μm.

15. The flexible power storage unit according to claim 11, wherein the flexible external body includes an embossed region.

16. The flexible power storage unit according to claim 11, wherein a plurality of positive electrodes and a plurality of negative electrodes are provided inside the flexible external body.

17. The flexible power storage unit according to claim 11, wherein the first region of the first lead electrode is welded to the positive electrode tab portion, and
wherein the first region of the second lead electrode is welded to the negative electrode tab portion.

18. The flexible power storage unit according to claim 11, wherein a part of the second region of the first lead electrode and a part of the second region of the second lead electrode are protruding from a first end portion of the flexible external body in the first direction.

19. The flexible power storage unit according to claim 11, wherein each of the first lead electrode and the second lead electrode further has a second folding line in the deformation region.

20. The flexible power storage unit according to claim 11, wherein the deformation region, the first region, and the first part of the second region of the first lead electrode, the deformation region, the first region, and the first part of the second region of the second lead electrode, the positive electrode tab portion, and the negative electrode tab portion are provided inside the flexible external body.

21. An electronic device comprising:
the flexible power storage unit according to claim 11; and
at least one of a display portion, an operation button, a speaker, and a microphone.

22. A flexible power storage unit comprising:
a flexible external body;
a positive electrode provided inside the flexible external body, the positive electrode including a positive electrode tab portion protruding in a first direction;
a negative electrode provided inside the flexible external body, the negative electrode including a negative electrode tab portion protruding in the first direction;
a first lead electrode provided on the positive electrode tab portion, the first lead electrode having:
    a first region over and in contact with the positive electrode tab portion;
    a first folding line at which the first lead electrode is folded on the positive electrode tab portion; and
    a second region being adjacent to the first folding line of the first lead electrode and provided over the first region of the first lead electrode; and
a second lead electrode provided on the negative electrode tab portion, the second lead electrode having:
    a first region over and in contact with the negative electrode tab portion;
    a first folding line at which the second lead electrode is folded on the negative electrode tab portion; and
    a second region being adjacent to the first folding line of the second lead electrode and provided over the first region of the second lead electrode,
wherein the first region of the first lead electrode is located between the positive electrode tab portion and a first part of the second region of the first lead electrode,
wherein the first region of the second lead electrode is located between the negative electrode tab portion and a first part of the second region of the second lead electrode.

23. The flexible power storage unit according to claim 22, wherein an angle formed by the first folding line of the first lead electrode and a straight line parallel to the first direction is greater than or equal to 45° and less than or equal to 90°.

24. The flexible power storage unit according to claim 22, wherein an angle formed by the first folding line of the second lead electrode and a straight line parallel to the first direction is greater than or equal to 45° and less than or equal to 90°.

25. The flexible power storage unit according to claim 22, wherein a thickness of part of the flexible external body is greater than or equal to 20 μm and less than or equal to 150 μm.

26. The flexible power storage unit according to claim 22, wherein the flexible external body includes an embossed region.

27. The flexible power storage unit according to claim 22, wherein a plurality of positive electrodes and a plurality of negative electrodes are provided inside the flexible external body.

28. The flexible power storage unit according to claim 22,
wherein the first region of the first lead electrode is welded to the positive electrode tab portion, and
wherein the first region of the second lead electrode is welded to the negative electrode tab portion.

29. The flexible power storage unit according to claim 22, wherein a second part of the second region of the first lead electrode and a second part of the second region of the second lead electrode are protruding from a first end portion of the flexible external body in the first direction.

30. The flexible power storage unit according to claim 22, wherein each of the first lead electrode and the second lead electrode further has a second folding line inside the flexible external body.

31. The flexible power storage unit according to claim 22, wherein the first folding line, the first region, and the first part of the second region of the first lead electrode, the first folding line, the first region, and the first part of the second region of the second lead electrode, the positive electrode tab portion, and the negative electrode tab portion are provided inside the flexible external body.

32. An electronic device comprising:
the flexible power storage unit according to claim 22; and
at least one of a display portion, an operation button, a speaker, and a microphone.

\* \* \* \* \*